US011376968B2

(12) United States Patent
Park

(10) Patent No.: US 11,376,968 B2
(45) Date of Patent: Jul. 5, 2022

(54) WIRELESS CHARGING DEVICE AND SYSTEM FOR TRANSPORTATION EQUIPMENT

(71) Applicant: Scramoge Technology Limited, Dublin (IE)

(72) Inventor: Jae Hee Park, Seoul (KR)

(73) Assignee: Scramoge Technology Limited, Dublin (IE)

(*) Notice: Subject to any disclaimer, the term of this patent is extended or adjusted under 35 U.S.C. 154(b) by 626 days.

(21) Appl. No.: 16/338,833

(22) PCT Filed: Oct. 17, 2017

(86) PCT No.: PCT/KR2017/011437
§ 371 (c)(1),
(2) Date: Apr. 2, 2019

(87) PCT Pub. No.: WO2018/074804
PCT Pub. Date: Apr. 26, 2018

(65) Prior Publication Data
US 2019/0248251 A1 Aug. 15, 2019

(30) Foreign Application Priority Data
Oct. 17, 2016 (KR) .......................... 10-2016-0134143

(51) Int. Cl.
*H02J 50/80* (2016.01)
*B60L 53/126* (2019.01)
(Continued)

(52) U.S. Cl.
CPC ............. *B60L 50/50* (2019.02); *B60L 53/126* (2019.02); *B60L 53/66* (2019.02); *B60N 2/00* (2013.01);
(Continued)

(58) Field of Classification Search
CPC ........ B60L 50/50; B60L 53/126; B60L 53/66; B60L 2250/22; B60L 3/0092;
(Continued)

(56) References Cited

U.S. PATENT DOCUMENTS 9,379,571 B2 * 6/2016 Boyer ................... B60L 53/665
10,011,182 B2 * 7/2018 Salter ...................... H02J 50/90
(Continued)

FOREIGN PATENT DOCUMENTS

JP         2012-5226 A      1/2012
JP         2014-79161 A     5/2014
(Continued)

OTHER PUBLICATIONS

International Search Report (PCT/ISA/210) issued in PCT/KR2017/011437, dated Jan. 30, 2018.

*Primary Examiner* — Stacy Whitmore
(74) *Attorney, Agent, or Firm* — Vorys, Sater, Seymour and Pease LLP

(57) ABSTRACT

The present invention relates to a wireless charging method and device(s) for a transportation equipment and a wireless charging system comprising the devices. A method for receiving wireless power in a wireless power receiving apparatus mounted on a vehicle according to an embodiment of the present invention may comprise the steps of: establishing a communication connection to wireless power transmission device when a wireless power signal transmitted by the wireless power transmission device is detected to be in an idle state; receiving low-power signals for low-power charging; receiving safety state information collected by a sensing device; and adjusting the strength of the received power on the basis of the safety state information. Therefore, (Continued)

the present invention has the advantage of preventing the harm of electromagnetic waves to passenger when wireless charging the vehicle.

15 Claims, 8 Drawing Sheets

(51) Int. Cl.
| | |
|---|---|
| H04W 4/48 | (2018.01) |
| B60L 53/66 | (2019.01) |
| H04W 4/021 | (2018.01) |
| B60L 50/50 | (2019.01) |
| B60R 21/015 | (2006.01) |
| B60N 2/00 | (2006.01) |
| H02J 50/90 | (2016.01) |
| H02J 50/60 | (2016.01) |
| H02J 50/10 | (2016.01) |
| H02J 7/02 | (2016.01) |
| H04B 5/00 | (2006.01) |

(52) U.S. Cl.
CPC .......... *B60R 21/015* (2013.01); *H02J 50/60* (2016.02); *H02J 50/80* (2016.02); *H02J 50/90* (2016.02); *H04W 4/021* (2013.01); *H04W 4/48* (2018.02); *B60N 2/002* (2013.01); *B60Y 2200/91* (2013.01); *B60Y 2300/91* (2013.01); *H02J 7/025* (2013.01); *H02J 50/10* (2016.02); *H04B 5/0037* (2013.01); *Y02T 10/70* (2013.01); *Y02T 90/16* (2013.01)

(58) Field of Classification Search
CPC ........ B60L 53/12; B60L 53/305; B60L 53/60; B60L 53/38; B60N 2/00; B60N 2/002; B60R 21/015; B60R 21/01512; B60R 21/01516; H02J 50/60; H02J 50/80; H02J 50/90; H02J 7/025; H02J 50/10; H04W 4/021; H04W 4/48; B60Y 2200/91; B60Y 2300/91; B60Y 2400/30; H04B 5/0037; Y02T 10/70; Y02T 90/16; Y02T 10/7072; Y02T 90/12; Y02T 90/14

See application file for complete search history.

(56) References Cited

U.S. PATENT DOCUMENTS

| | | | |
|---|---|---|---|
| 11,146,092 B2* | 10/2021 | Lee | H01F 1/14733 |
| 11,164,262 B1* | 11/2021 | Tofte | G06Q 40/08 |
| 2009/0046538 A1* | 2/2009 | Breed | B60R 25/102 367/93 |
| 2012/0206098 A1* | 8/2012 | Kim | B60L 53/39 320/108 |
| 2013/0024059 A1 | 1/2013 | Miller et al. | |
| 2014/0240143 A1* | 8/2014 | Wu | H04W 4/80 340/870.07 |
| 2016/0059733 A1* | 3/2016 | Hettrich | H04W 4/029 701/2 |
| 2016/0176265 A1* | 6/2016 | Rolka | B60W 40/08 701/45 |
| 2017/0066334 A1* | 3/2017 | Sindia | H02J 50/10 |
| 2017/0120757 A1* | 5/2017 | Lewis | B60L 53/60 |
| 2017/0140603 A1* | 5/2017 | Ricci | B60L 3/0015 |
| 2017/0179766 A1* | 6/2017 | Zeine | H02J 50/80 |
| 2017/0197548 A1* | 7/2017 | Thomas | B60N 3/044 |
| 2017/0213165 A1* | 7/2017 | Stauffer | G06Q 10/02 |
| 2018/0025604 A1* | 1/2018 | Protopsaltis | G08B 21/0205 340/457 |
| 2018/0056784 A1* | 3/2018 | Virgilio | B60R 21/01 |
| 2018/0059913 A1* | 3/2018 | Penilla | B60W 40/08 |
| 2018/0126872 A1* | 5/2018 | Folino | G08B 21/24 |
| 2019/0265868 A1* | 8/2019 | Penilla | G07C 5/008 |
| 2019/0296589 A1* | 9/2019 | Ardavan | G01R 33/441 |
| 2021/0291730 A1* | 9/2021 | De La Cruz | H02J 7/35 |
| 2021/0339708 A1* | 11/2021 | Dumov | B60R 25/25 |

FOREIGN PATENT DOCUMENTS

| | | |
|---|---|---|
| KR | 10-2010-0112034 A | 10/2010 |
| KR | 10-2014-0076146 A | 6/2014 |

* cited by examiner

| HEADER | PACKET TYPE | MESSAGE SIZE (BYTES) |
|---|---|---|
| 0x01 | Signal Strength | 1 |
| 0x02 | End Power Transfer | 1 |
| 0x06 | Power Control Hold-off | 1 |
| 0x51 | Configuration | 5 |
| 0x71 | Identification | 7 |
| 0x81 | Extended Identification | 8 |
| 0x07 | General Request | 1 |
| 0x20 | Specific Request | 2 |
| 0x22 | FOD Status | 2 |
| 0x03 | Control Error | 1 |
| 0x09 | Renegotiate | 1 |
| 0x31 | 24-bit Received Power | 3 |
| 0x04 | 8-bit Received Power | 1 |
| 0x05 | Charge Status | 1 |

WIRELESS CHARGING DEVICE AND SYSTEM FOR TRANSPORTATION EQUIPMENT

CROSS REFERENCE TO RELATED APPLICATIONS

This application is the National Phase of PCT International Application No. PCT/KR2017/011437, filed on Oct. 17, 2017, which claims priority under 35 U.S.C. 119(a) to Patent Application No. 10-2016-0134143, filed in the Republic of Korea on Oct. 17, 2016, all of which are hereby expressly incorporated by reference into the present application.

TECHNICAL FIELD

Embodiments relate to wireless charging technology and, more particularly, a wireless charging method and device(s) capable of preventing a passenger from being damaged by electromagnetic waves when wirelessly charging a transportation apparatus such as an electric vehicle, and a wireless charging system including the devices.

BACKGROUND ART

Wireless power transmission or wireless energy transfer refers to technology for wirelessly transmitting electric energy from a transmitter to a receiver using the magnetic induction principle. In 1800s, electric motors or transformers using the electromagnetic induction principle have begun to be used and, thereafter, attempts have been made to radiate electromagnetic waves such as radio waves, lasers, high frequencies or microwaves to transfer electric energy. Frequently used electric toothbrushes or some wireless shavers are charged using the electromagnetic induction principle.

Up to now, a wireless energy transfer method may be roughly divided into a magnetic induction method, an electromagnetic resonance method and a radio frequency (RF) transmission method of a short-wavelength radio frequency.

The magnetic induction method uses a phenomenon that, when two coils are located adjacent to each other and then current is applied to one coil, a magnetic flux is generated to cause an electromotive force in the other coil, and is rapidly being commercialized in small devices such as mobile phones. The magnetic induction method may transfer power of up to several hundreds of kilowatts (kW) and has high efficiency. However, since a maximum transmission distance is 1 centimeter (cm) or less, a device to be charged should be located adjacent to a charger or the floor.

The electromagnetic resonance method uses an electric field or a magnetic field instead of using electromagnetic waves or current. The electromagnetic resonance method is rarely influenced by electromagnetic waves and thus is advantageously safe for other electronic devices or human bodies. In contrast, this method may be used in a limited distance and space and energy transmission efficiency is somewhat low.

The short-wavelength wireless power transmission method (briefly, referred to as the RF transmission method) takes advantage of the fact that energy may be directly transmitted and received in the form of a radio wave. This technology is a RF wireless power transmission method using a rectenna. The rectenna is a combination of an antenna and a rectifier and means an element for directly converting RF power into DC power. That is, the RF method is technology of converting AC radio waves into DC. Recently, as efficiency of the RF method has been improved, studies into commercialization of the RF method have been actively conducted Wireless power transmission technology may be used not only in mobile related industries but also in various industries such as vehicles, IT, railroad and home appliance.

In particular, a transportation apparatus such as an electric vehicle requires high-power wireless charging. Therefore, safety of a passenger against electromagnetic waves when wireless charging of a vehicle is required.

DISCLOSURE

Technical Problem

Embodiments provide a wireless charging method and device(s) capable of preventing a passenger from being harmed by electromagnetic waves when wirelessly charging a transportation apparatus such as an electric vehicle, and a wireless charging system including the devices.

The technical problems solved by the embodiments are not limited to the above technical problems and other technical problems which are not described herein will become apparent to those skilled in the art from the following description.

Technical Solution

Embodiments provide wireless charging methods of a transportation apparatus, and devices and a system therefor.

In an embodiment, a wireless power reception method of a wireless power reception device mounted in a transportation apparatus includes establishing a communication link with a wireless power transmission device when a wireless power signal transmitted by the wireless power transmission device is detected in an idle state, receiving a low-power signal to perform low-power charging, receiving safety status information collected by a sensing device, and controlling a strength of received power based on the safety status information.

The wireless power reception method may further include transmitting a predetermined first power control signal for requesting high-power signal transmission to the wireless power transmission device through the communication link, upon determining that all passengers who have ridden in the transportation apparatus have moved to a safe area based on the safety status information.

The safety status information may include information on distances between the wireless power reception device and the passengers, and the high-power transmission may be requested when the distances exceed a predetermined reference value.

The wireless power reception method may further include receiving a high-power signal in response to the first power control signal to perform high-power charging and determining whether switching to low power is necessary based on the safety status information received during the high-power charging.

The wireless power reception method may further include transmitting a second power control signal for requesting low-power signal transmission to the wireless power transmission device, upon determining that switching to low power is necessary.

For example, the sensing device may be mounted in the transportation apparatus, and a controller mounted in the transportation apparatus may generate the safety status information based on sensing information collected from the sensing device and then transmit the safety status information to the wireless power reception device.

In another example, the sensing device may be connected to the wireless power transmission device, and the safety status information generated by the wireless power transmission device corresponding to sensing information collected from the sensing device may be received through the established communication link.

In addition, the sensing device may include at least one of a motion sensor, a distance detection sensor or an infrared detection sensor.

The wireless power reception method may further include determining whether passengers have exited the transportation apparatus before establishing the communication link, when the wireless power signal is detected, and, when all passengers have exited, the communication link may be established.

In addition, when boarding status information is received from a controller mounted in the transportation apparatus, the wireless power reception device may determine whether the passengers have exited based on the boarding status information.

The boarding status information may be generated by the controller based on at least one of pressure sensing information collected from pressure sensors mounted in seats provided in the transportation apparatus, opening/closing sensing information of doors provided in the transportation apparatus or image sensing information corresponding to images captured by a camera mounted in the transportation apparatus.

In another embodiment, a wireless power transmission method of a wireless power transmission device for transmitting power to a wireless power reception device mounted in a transportation apparatus includes identifying the wireless power reception device, establishing a communication link with the identified wireless power reception device, transmitting a low-power signal to the wireless power reception device, and controlling a strength of transmitted power based on safety status information generated based on sensing information collected from a sensing device.

The wireless power transmission method may further include transmitting a high-power signal, upon determining that all passengers who have ridden in the transportation apparatus have moved to a safe area based on the safety status information.

The safety status information may include information on distances between the wireless power reception device and the passengers, and the high-power transmission may be requested when the distances exceed a predetermined reference value.

The wireless power transmission method may further include determining whether switching to low power is necessary based on the safety status information received during the high-power signal transmission.

The wireless power transmission method may further include transmitting the low-power signal, upon determining that switching to low power is necessary.

For example, the sensing device may be mounted in the transportation apparatus, and a controller mounted in the transportation apparatus may generate the safety status information based on sensing information collected from the sensing device and then transmit the safety status information to the wireless power reception device.

In another example, the sensing device may be connected to the wireless power transmission device, and the wireless power transmission device may generate the safety status information based on sensing information collected from the sensing device.

In addition, the sensing device may include at least one of a motion sensor, a distance detection sensor or an infrared detection sensor.

The wireless power transmission method may further include determining whether passengers have exited the transportation apparatus based on sensing information collected from the sensing device before establishing the communication link, and, when all passengers have exited, the communication link may be established.

The sensing information for determining whether the passengers have exited may include sensing information detected by at least one of an infrared detection sensor, a distance detection sensor or a motion detection sensor.

In another embodiment, a wireless power reception device mounted in a transportation apparatus to wirelessly receive power from a wireless power transmission device includes a power receiver configured to receive a wireless power signal, a first communication unit configured to perform communication with the wireless power transmission device, a second communication unit configured to perform communication with a vehicle controller mounted in the transportation apparatus, and a first controller configured to determine a strength of required power based on status information received through the second communication unit.

Here, the status information may include at least one of boarding status information or safety status information.

In addition, the wireless power reception device may further include a boarding status determination unit configured to determine whether all passengers who have ridden in the transportation apparatus have exited based on the boarding status information.

In addition, upon determining that all passengers have exited, the first controller may transmit a predetermined power control signal for requesting low-power transmission through the first communication unit.

In addition, the wireless power reception device may further include a safety status determination unit configured to determine whether high-power reception is possible based on the safety status information, when the safety status information is received during low-power charging according to the request for low-power transmission and, upon determining that high-power reception is possible, the first controller may transmit a predetermined power control signal for requesting high-power transmission through the first communication unit.

In another embodiment, a wireless power transmission device for wirelessly transmitting power to a wireless power reception device mounted in a transportation apparatus includes a power transmitter configured to transmit a wireless power signal, a third communication unit configured to perform communication with the wireless power reception device, and a second controller configured to determine whether passengers who have ridden in the transportation apparatus have exited and a safety status based on sensing information collected from a sensing device and to control a strength of a wireless power signal transmitted through the power transmitter according to the result of determination.

The aspects of the disclosure are only a part of the preferred embodiments of the disclosure, and various embodiments based on technical features of the disclosure may be devised and understood by the person with ordinary skill in the art based on the detailed description of the disclosure.

Advantageous Effects

The effects of methods and devices according to embodiments are as follows.

Embodiments provide wireless charging devices and system capable of preventing a passenger from being damaged by electromagnetic waves when wirelessly charging a transportation apparatus.

The effects of the disclosure are not limited to the above-described effects and other effects which are not described herein may be derived by those skilled in the art from the following description of the embodiments of the disclosure. That is, effects which are not intended by the disclosure may be derived by those skilled in the art from the embodiments of the disclosure.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

Figure 1:
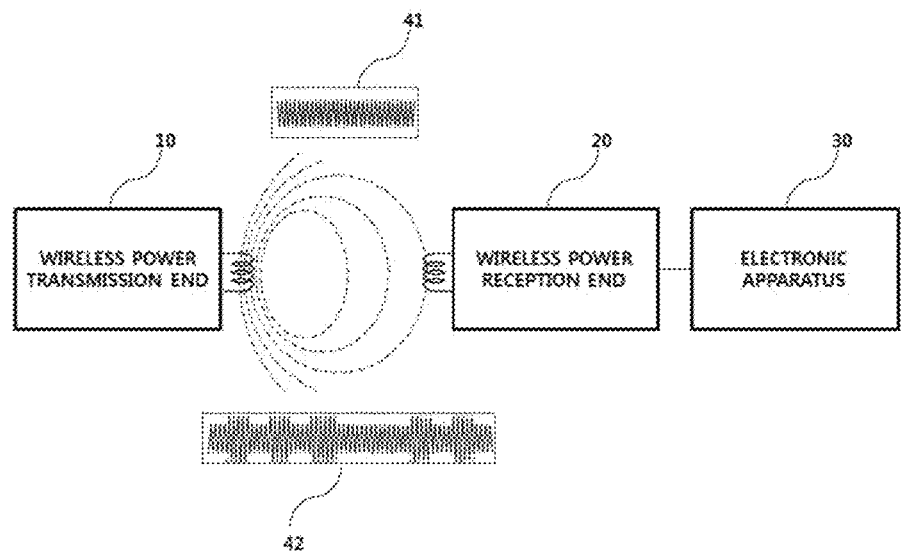
FIG. 1 is a block diagram illustrating a wireless charging system according to an embodiment.

A wireless power reception method of a wireless power reception device mounted in a transportation apparatus according to a first embodiment includes establishing a communication link with a wireless power transmission device when a wireless power signal transmitted by the wireless power transmission device is detected in an idle state, receiving a low-power signal to perform low-power charging, receiving safety status information collected by a sensing device, and controlling a strength of received power based on the safety status information.

Mode for Invention

Hereinafter, apparatuses and various methods according to embodiments will be described in detail with reference to the accompanying drawings. In general, a suffix such as "module" or "unit" may be used to refer to elements or components. Use of such a suffix herein is merely intended to facilitate description of the specification, and the suffix itself is not intended to have any special meaning or function.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the description of embodiments, an apparatus for transmitting wireless power in a wireless power system may be used interchangeably with a wireless power transmitter, a wireless power transfer apparatus, a wireless electric power transfer apparatus, a wireless electric power transmitter, a transmission end, a transmitter, a transmission apparatus, a transmission side, a wireless power transfer apparatus, a wireless power transferer, etc., for convenience of description. An apparatus for receiving wireless power from a wireless power transfer apparatus may be used interchangeably with a wireless electric power reception apparatus, a wireless electric power receiver, a wireless power reception apparatus, a wireless power receiver, a reception terminal, a reception side, a reception apparatus, a receiver, etc.

The transmitter according to embodiment may be configured in the form of a pad, a cradle, an access point (AP), a small base station, a stand, a ceiling embedded structure, a floor-embedded structure or a wall-mounted structure. One transmitter may transfer wireless power to a plurality of wireless power reception apparatuses. To this end, the transmitter may include at least one wireless power transfer means. Here, the wireless power transfer means may use various wireless power transfer standards based on an electromagnetic induction method of performing charging using the electromagnetic induction principle in which a magnetic field is generated in a power transfer-end coil and electricity is induced in a reception-end coil by the magnetic field. For example, the wireless power transfer means may include wireless charging technology of the electromagnetic induction method defined in the wireless charging technology organizations such as the Wireless Power Consortium (WPC) and Power Matters Alliance (PMA).

In addition, a receiver according to an embodiment may include at least one wireless power reception means and may simultaneously receive wireless power from two or more transmitters. Here, the wireless power reception means may include wireless charging technology of the electromagnetic induction method defined in the Wireless Power Consortium (WPC) and Power Matters Alliance (PMA) which are the wireless charging technology organizations, without being limited thereto.

The wireless power receiver according to the embodiment may be mounted on one side of a transportation apparatus, without being limited thereto, and may be mounted in any apparatus including wireless power reception means according to embodiment to charge a battery.

FIG. 1 is a block diagram illustrating a wireless charging system according to an embodiment.

Referring to FIG. 1, the wireless charging system roughly includes a wireless power transfer end 10 for wirelessly transmitting power, a wireless power reception end for receiving the transmitted power and an electronic apparatus 30 for receiving the received power.

For example, the wireless power transfer end 10 and the wireless power reception end 20 may perform in-band communication in which information is exchanged using the same frequency band as the operating frequency used for wireless power transfer. In another example, the wireless power transfer end 10 and the wireless power reception end 20 may perform out-of-band communication in which information is exchanged using the frequency band different from the operating frequency used for wireless power transfer.

For example, the information exchanged between the wireless power transfer end 10 and the wireless power reception end 20 may include status information of each other and control information. Here, the status information and the control information exchanged between the transmission end and the reception end will become more apparent through the following description of the embodiments.

In-band communication and out-of-communication may provide bidirectional communication, but the embodiments are not limited thereto. In another embodiment, in-band communication and out-of-communication may provide a unidirectional communication or half duplex communication.

For example, unidirectional communication may, but is not limited to, mean transmission of information from the wireless power reception end 20 to the wireless power transfer end 10 or transmission from the wireless power transfer end 10 to the wireless power reception end 20.

The half duplex communication method is characterized in that bidirectional communication between the wireless power reception end 20 and the wireless power transfer end 10 is enabled but information can be transmitted only by one device at a certain point in time.

The wireless power reception end 20 according to the embodiment may acquire a variety of status information of the electronic apparatus 30. For example, the status information of the electronic apparatus 30 may include, but is not limited to, current power usage information, current power usage information, information for identifying an executed application, CPU usage information, battery charge status information, battery output voltage/current information, etc. and may include information capable of being acquired from the electronic apparatus 30 and being used for wireless power control.

In particular, the wireless power transfer end 10 according to the embodiment may transmit a predetermined packet indicating whether fast charging is supported to the wireless power reception end 20. The wireless power reception end 20 may inform the electronic apparatus 30 that the wireless power transfer end 10 supports the fast charging mode, upon determining that the wireless power transfer end 10 supports the fast charging mode. The electronic apparatus 30 may display information indicating that fast charging is possible through a predetermined display means, for example, a liquid crystal display.

In addition, the user of the electronic apparatus 30 may select a predetermined fast charging request button displayed on the liquid crystal display means and control the wireless power transmission end 10 to operate in the fast charging mode. In this case, when the user selects the fast charging request button, the electronic apparatus 30 may transmit a predetermined fast charging request signal to the wireless power reception end 20. The wireless power reception end 20 may generate and transmit a charging mode packet corresponding to the received fast charging request signal to the wireless power transmission end 10, thereby switching a normal low-power charging mode to the fast charging mode.

Figure 2:
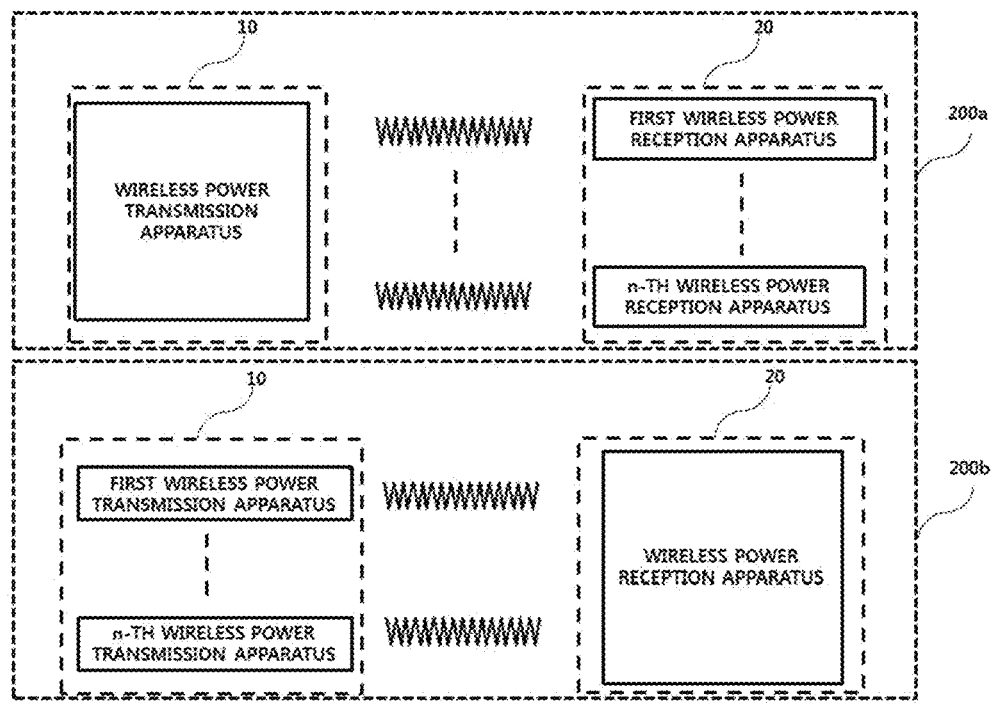
FIG. 2 is a block diagram illustrating a wireless charging system according to another embodiment.

FIG. 2 is a block diagram illustrating a wireless charging system according to another embodiment.

For example, as denoted by reference numeral 200a, the wireless power reception end 20 may include a plurality of wireless power reception apparatuses, which are connected to one wireless power transfer end 10 to perform wireless charging. At this time, the wireless power transfer end 10 may divide and transfer power to the plurality of wireless power reception apparatuses in a time-divisional manner but is not limited thereto. In another example, the wireless power transfer end 10 may divide and transfer power to the plurality of wireless power reception apparatus using different frequency bands respectively allocated to the wireless power reception apparatuses.

At this time, the number of wireless power reception apparatuses connectable to one wireless power transfer apparatus 10 may be adaptively determined based on at least one of the required power amount of each wireless power reception apparatus, a battery charge state, power consumption of the electronic apparatus and available power amount of the wireless power transfer apparatus.

In another example, as denoted by reference numeral 200b, the wireless power transfer end 10 may include a plurality of wireless power transfer apparatuses. In this case, the wireless power reception end 20 may be simultaneously connected to the plurality of wireless power transfer apparatuses and may simultaneously receive power from the connected wireless power transfer apparatuses to perform charging. At this time, the number of wireless power transfer apparatuses connected to the wireless power reception end 20 may be adaptively determined based on the required power amount of the wireless power reception end 20, a battery charge state, power consumption of the electronic apparatus, and available power amount of the wireless power transfer apparatus.

Figure 3:
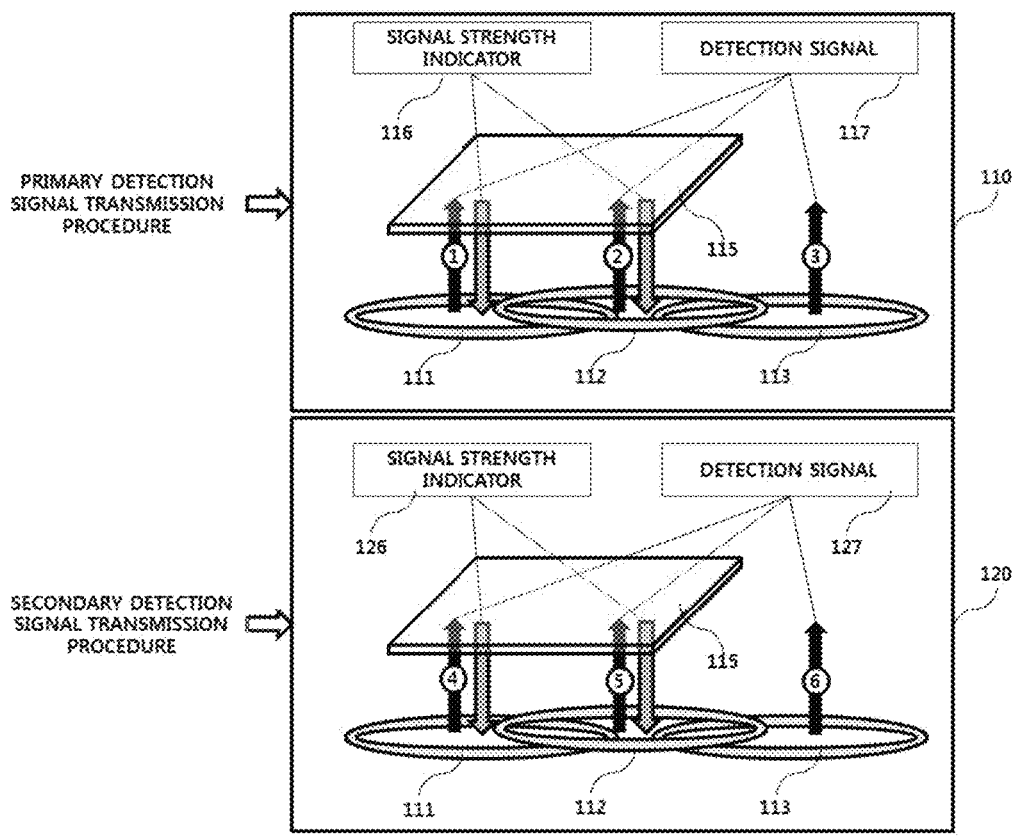
FIG. 3 is a diagram illustrating a procedure for transmitting a detection signal in a wireless charging system according to an embodiment.

FIG. 3 is a diagram illustrating a procedure for sensing a wireless power receiver in a wireless charging system according to an embodiment.

For example, a wireless power transmitter may include three transmission coils 111, 112 and 113. Each transmission coil may partially overlap another transmission coil and the wireless power transmitter sequentially transmits predetermined detection signals 117 and 127 for sensing presence of a wireless power receiver through each transmission coil, for example, digital ping signals, in a predefined order.

As shown in FIG. 3, the wireless power transmitter may sequentially transmit the detection signal 117 when a primary detection signal transmission procedure denoted by reference numeral 110 starts, and identify the transmission coils 111 and 112 for receiving a predetermined response signal, for example, a signal including received signal strength information corresponding to a detection signal (hereinafter referred to as a signal strength indicator 116 or a signal strength packet) from the wireless power receiver 115. Subsequently, the wireless power transmitter may sequentially transmit the detection signal 127 when a secondary detection signal transmission procedure denoted by reference numeral 120 starts, identify a transmission coil having good power transfer efficiency (or charging efficiency), that is, good alignment state between the transmission coil and the reception coil, between the transmission coils 111 and 112 for receiving the signal strength indicator 126, and perform control to transfer power through the identified transmission coil, that is, perform wireless charging.

As shown in FIG. 3, the wireless power transmits the two detection signal transmission procedures in order to more accurately determine in which transmission coil the reception coil of the wireless power receiver is well aligned.

As denoted by reference numerals 110 and 120 of FIG. 3, if the signal strength indicators 116 and 126 are received in the first transmission coil 111 and the second transmission coil 112, the wireless power transmitter selects a best aligned transmission coil based on the signal strength indicator 126 received in the first transmission coil 111 and the second transmission coil 112 and performs wireless charging using the selected transmission coil.

Figure 4:
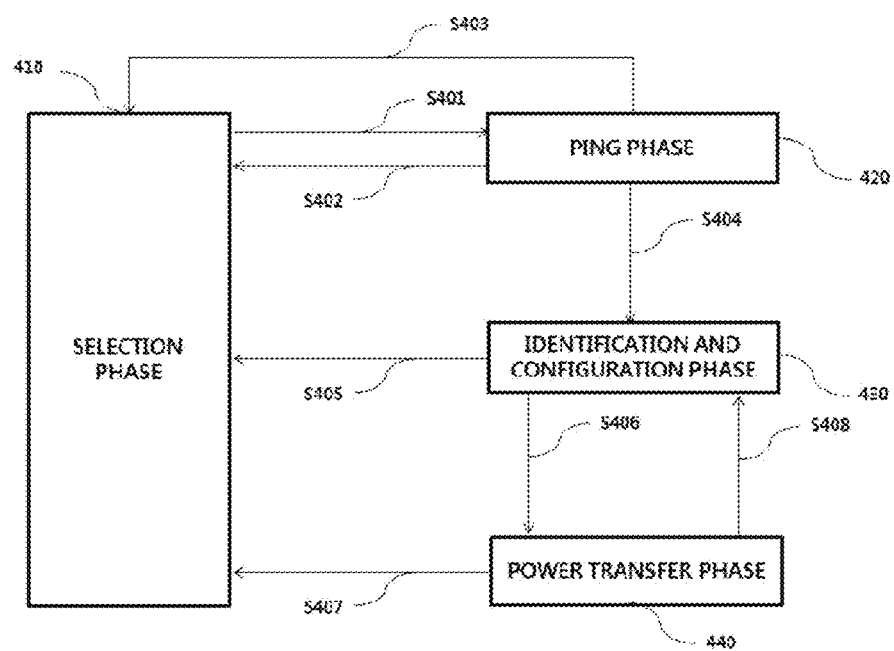
FIG. 4 is a state transition diagram explaining a wireless power transfer procedure according to an embodiment.

FIG. 4 is a state transition diagram explaining a wireless power transfer procedure according to an embodiment.

Referring to FIG. 4, power transfer from the transmitter to the receiver according to the embodiment may be roughly divided into a selection phase 410, a ping phase 420, an identification and configuration phase 430 and a power transfer phase 440.

The selection phase 410 may transition when power transfer starts or when a specific error or a specific event is detected while power transfer is maintained. The specific error and the specific event will become apparent from the following description. In addition, in the selection phase 410, the transmitter may monitor whether an object is present on an interface surface. When it is detected that the object is present on the interface surface, the transmitter may transition to the ping phase 420 (S401). In the selection phase 410, the transmitter transmits an analog ping signal having a very short pulse and detect whether an object is present in an active area of the interface surface based on change in current flowing in the transmission coil. In another example, the transmitter may detect whether an object is present in an active area of the interface surface based on change in impedance of the transmission coil or change in inductance of the transmission coil.

In the ping phase 420, when the object is detected, the transmitter activates the receiver and transmits a digital ping for identifying whether the receiver is capable of receiving wireless power from the transmitter. In the ping phase 420, when a response signal to the digital ping, for example, a signal strength indicator, is not received from the receiver within a predetermined time, the transmitter may transition to the selection phase 410 again (S402). In addition, in the ping phase 420, when a signal indicating that power transfer has been terminated, that is, charging termination signal, is received from the receiver, the transmitter may transition to the selection phase 410 (S403).

If the ping phase 420 is finished, the transmitter may transition to the identification and configuration phase 430 for identifying the receiver and collecting the reception configuration and status information (S404).

In the identification and configuration phase 430, when an unexpected packet is received, when an expected packet is not received during a predetermined time (timeout), when a packet transmission error occurs, or when power transfer contract is not established (no power transfer contract), the transmitter may transition to the selection phase 410 (S405).

When identification and configuration of the receiver is finished, the transmitter may transition to the power transfer phase 440 for transmitting wireless power (S406).

In the power transfer phase 440, when an unexpected packet is received, when an expected packet is not received during a predetermined time (timeout), when predetermined power transfer contract violation occurs, or when charging is terminated, the transmitter may transition to the selection phase 410 (S407).

In addition, in the power transfer phase 440, when the power transfer contract needs to be reconfigured according to transmitter state change, the transmitter may transition to the identification and configuration phase 430 (S408).

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 5:
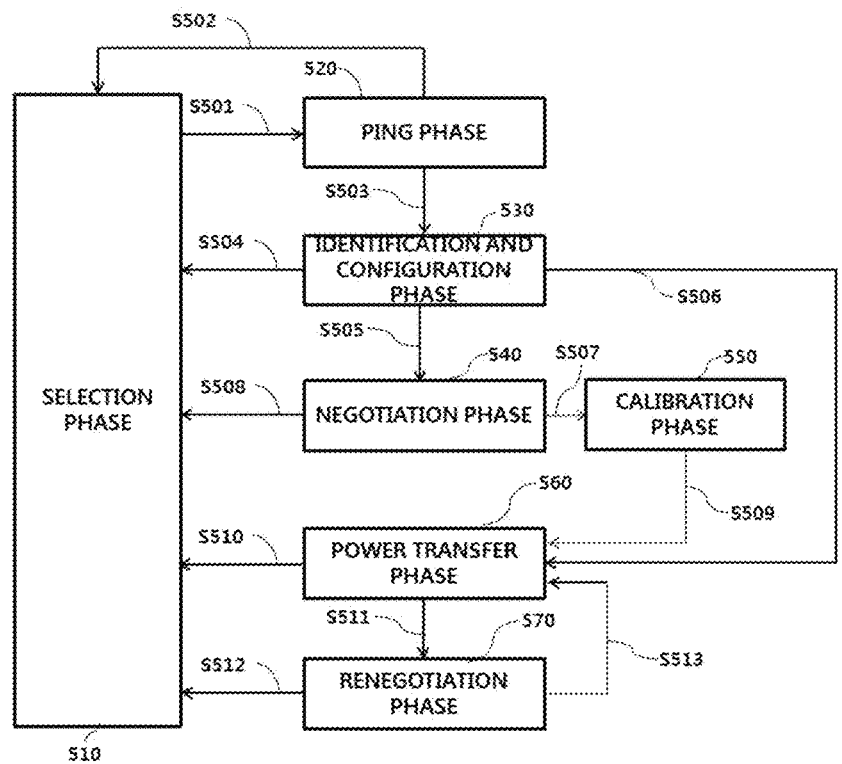
FIG. 5 is a state transition diagram explaining a wireless power transfer procedure according to another embodiment.

FIG. 5 is a state transition diagram explaining a wireless power transfer procedure according to another embodiment.

Referring to FIG. 5, power transfer from the transmitter to the receiver may be roughly divided into a selection phase 510, a ping phase, 520, an identification and configuration phase 530, a negotiation phase 540, a calibration phase 550, a power transfer phase 560 and a renegotiation phase 570.

The selection phase 510 may transition when power transfer starts or when a specific error or a specific event is detected while power transfer is maintained. The specific error and the specific event will become apparent from the following description. In addition, in the selection phase 510, the transmitter may monitor whether an object is present on an interface surface. When it is detected that the object is present on the interface surface, the transmitter may transition to the ping phase 520. However, the analog ping may be replaced by another means. The another means may be at least one of a proximity sensor, a Hall sensor for detecting change in magnetic field or a pressure sensor or may be omitted. In the selection phase 510, the transmitter transmits an analog ping signal having a very short pulse and detects whether an object is present in an active area of the interface surface based on change in current of a transmission coil or a primary coil.

In the ping phase 520, when the object is detected, the transmitter activates the receiver and transmits a digital ping for identifying whether the receiver is capable of wireless power from the transmitter. In the ping phase 520, when a response signal to the digital ping, for example, a signal strength packet, is not received from the receiver within a predetermined time after transmitting the digital ping, the transmitter may transition to the selection phase 510 again. In addition, in the ping phase 520, when a signal indicating that power transfer has been terminated, that is, a charging termination packet, is received from the receiver, the transmitter may transition to the selection phase 510.

If the ping phase 520 is finished, the transmitter may transition to the identification and configuration phase 530 for identifying the receiver and collecting the configuration and status information of the receiver.

In the identification and configuration phase 530, when an unexpected packet is received, when an expected packet is not received during a predetermined time (timeout), when a packet transmission error occurs, or when power transfer contract is not established (no power transfer contract), the transmitter may transition to the selection phase 510.

The transmitter may determine whether entry into the negotiation phase 540 is necessary based on the negotiation field value of the configuration packet received in the identification and configuration phase 530.

Upon determining that negotiation is necessary, the transmitter may transition to the negotiation phase 540 to perform a predetermined foreign object detection procedure.

In contrast, upon determining that negotiation is not necessary, the transmitter may immediately transition to the power transfer phase 560.

In the negotiation phase 540, the transmitter may receive a foreign object detection (FOD) status packet including a reference quality factor value. At this time, the transmitter may determine a threshold value for foreign object detection based on the reference quality factor value.

For example, the transmitter may determine a value lower than the reference quality factor value by a calibration rate as a threshold value for foreign object detection and measure a current quality factor value before entering the ping phase 520 after detecting the object.

The transmitter may detect whether the foreign object is present in the charging area by comparing the determined threshold value with the currently measured quality factor value, and control power transfer according to the foreign object detection result.

For example, when the foreign object is detected, the transmitter may return to the selection phase 510. In contrast, when the foreign object is not detected, the transmitter may transition to the power transfer phase 560 through the calibration phase 550. Specifically, when the foreign object is not detected, the transmitter may measure power loss in the receiver and the transmitter, in order to determine the strength of the power received by the receiver end and to determine the strength of the power actually transmitted through the transmission coil in the calibration phase 550. That is, the transmitter may predict power loss based on a difference between the transmission power of the transmitter and the reception power of the receiver in the calibration phase 550. The transmitter according to one embodiment may calibrate the threshold value for foreign object detection using the predicted power loss. Accordingly, the transmitter can more accurately detect the foreign object.

In the power transfer phase 560, when an unexpected packet is received, when an expected packet is not received during a predetermined time (timeout), when power transfer contract violation occurs or when charging is finished, the transmitter may transition to the selection phase 510.

In addition, in the power transfer phase 560, if power transfer contract needs to be reconfigured according to transmitter status change, etc., the transmitter may transition to the renegotiation phase 570. At this time, when renegotiation is normally finished, the transmitter may return to the power transfer phase 560.

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 6:
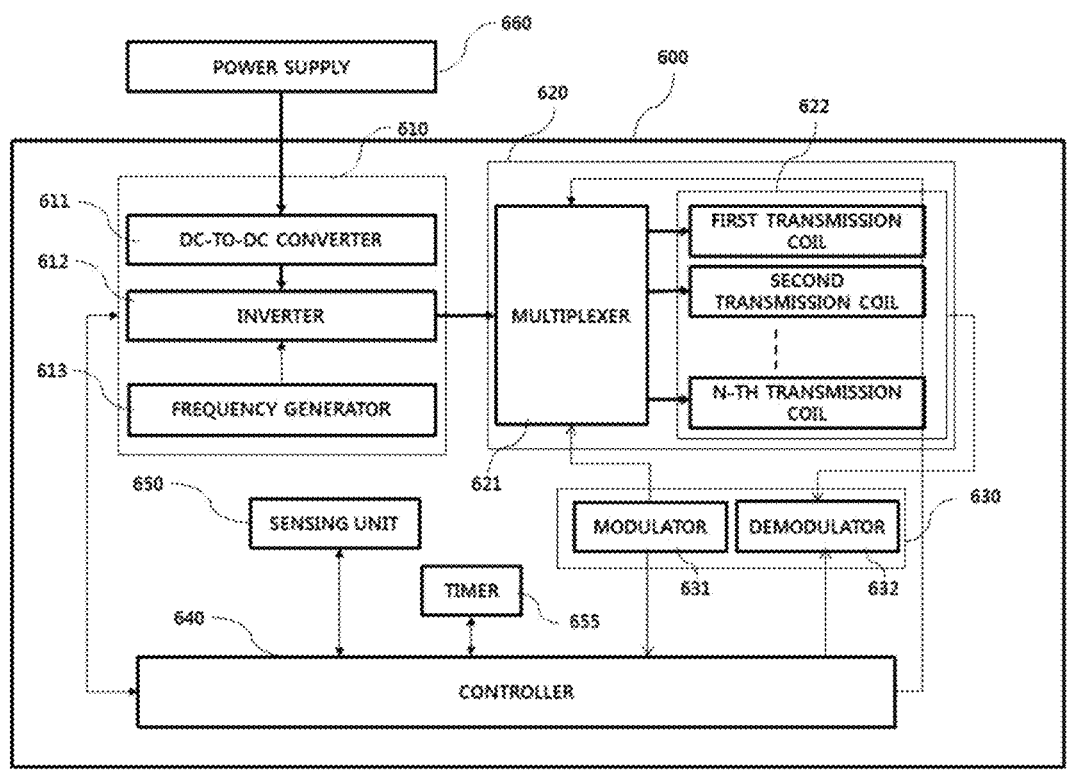
FIG. 6 is a block diagram illustrating the structure of a wireless power transmitter according to an embodiment.

FIG. 6 is a block diagram illustrating the structure of a wireless power transmitter according to an embodiment.

Referring to FIG. 6, the wireless power transmitter 600 may roughly include a power converter 610, a power transmission unit 620, a communication unit 630, a controller 640, and a sensing unit 650. The configuration of the wireless power transmitter 600 is not necessarily essential and thus more or fewer components may be included.

As shown in FIG. 6, the power converter 610 may serve to receive DC power from a power supply 660 and convert the DC power into AC power having a predetermined strength.

The power converter 610 may include a DC-to-DC converter 611, an inverter 612, and a frequency generator 613. Here, the inverter 612 may be a half-bridge inverter or a full-bridge inverter, without being limited thereto, and any circuit capable of converting DC power into AC power having a specific operation frequency may be used.

The DC-to-DC converter 611 may perform a function for converting DC power received from the power supply 650 into DC power having a specific strength according to a control signal of the controller 640.

At this time, the sensing unit 650 may measure and supply the voltage/current of the converted DC power to the controller 640. In addition, the sensing unit 650 may measure the internal temperature of the wireless power transmitter 600 and supply the measured result to the controller 640, in order to determine whether overheating occurs. For example, the controller 640 may adaptively cut off power supplied from the power supply 650 or prevent power from being supplied to the amplifier 612 based on the voltage/current value measured by the sensing unit 650. A predetermined power cutoff circuit for cutting off power supplied from the power supply 650 or power supplied to the amplifier 612 may be further provided at one side of the power converter 610.

The inverter 612 may convert the DC-to-DC converted DC power into AC power based on a reference AC signal generated by the frequency generator 613. At this time, the frequency, that is, operating frequency, of the reference AC signal may be dynamically changed according to the control signal of the controller 640. The wireless power transmitter 600 according to the embodiment may control the operating frequency to control the strength of the transmitted power. For example, the controller 640 may receive power reception status information or (and) a power control signal of the wireless power receiver through the communication unit 630, determine the operating frequency based on the received power reception status information or (and) power control signal, and dynamically control the frequency generator 613 to generate the determined operation frequency. For example, the power reception status information may include, but is not limited to, the strength information of a rectifier output voltage, the strength information of current applied to a reception coil, etc. The power control signal may include a signal for requesting power increase, a signal for requesting power decrease, etc.

The power transmission unit 620 may include a multiplexer 621 and a transmission coil unit 622. Here, the transmission coil unit 622 may include first to n-th (n being an integer equal to or greater than 2) transmission coils. In addition, the power transmission unit 620 may further include a carrier generator (not shown) for generating a specific carrier frequency for power transfer. In this case, the carrier generator may generate a specific carrier frequency to be mixed with output AC power of the inverter 612 received through the multiplexer 621. In one embodiment, it should be noted that the frequencies of the AC powers sent to the transmission coils may be different from each other. In another embodiment, the resonant frequencies of the transmission coils may be differently set using a predetermined frequency controller having a function for differently adjusting LC resonance characteristics of the transmission coils.

The multiplexer 621 may perform a switch function for transmitting AC power to a transmission coil selected by the controller 640. The controller 640 may select a transmission coil to be used to transmit power to the wireless power receiver based on a signal strength indicator received for each transmission coil.

The controller 640 according to one embodiment may transmit power through time division multiplexing of the transmission coils if a plurality of wireless power receivers is connected. For example, if the wireless power transmitter 600 identifies three wireless power receivers, that is, first to third receivers, through three different transmission coils, that is, first to third transmission coils, the controller 640 may control the multiplexer 621 to perform control to transmit AC power only through a specific transmission coil in a specific time slot. At this time, although the amount of power transmitted to the wireless power receiver may be controlled according to the length of the time slot allocated to each transmission coil, this is merely exemplary and the strength of the output DC power of the DC-TO-DC converter 611 may be controlled during the time slot allocated to each transmission coil to control the power transmitted to each wireless power receiver.

The controller 640 may control the multiplexer 621 such that a detection signal is sequentially transmitted through the first to n-th transmission coils 622 during a primary detection signal transmission procedure. At this time, the controller 640 may identify a time when the detection signal will be transmitted using a timer 655 and control the multiplexer 621 to transmit the detection signal through the corresponding transmission coil when the detection signal transmission time arrives. For example, the timer 650 may transmit a specific event signal to the controller 640 at predetermined periods during the ping transmission phase, and the controller 640 may control the multiplexer 621 to transmit the digital ping through the corresponding transmission coil, whenever the corresponding event signal is detected.

In addition, the controller 640 may receive a predetermined transmission coil identifier for identifying through which transmission coil a signal strength indicator has been received from a demodulator 632 during the primary detection signal transmission procedure and the signal strength indicator received through the corresponding transmission coil. Subsequently, in a secondary detection signal transmission procedure, the controller 640 may control the multiplexer 621 to transmit the detection signal only through the transmission coil(s) through which the signal strength indicator is received during the primary detection signal transmission procedure. In another example, if the signal strength indicator is received through the plurality of transmission coils during the primary detection signal transmission procedure, the controller 640 may determine a transmission coil, through which a signal strength indicator having a largest value is received, as a transmission coil, through which the detection signal will be first transmitted in the secondary detection signal transmission procedure, and control the multiplexer 621 according to the result of determination.

The communication unit 630 may include at least one of a modulator 631 or a demodulator 632.

A modulator 631 may modulate the control signal generated by the controller 640 and transmit the modulated signal to the multiplexer 621. Here, the modulation method of modulating the control signal may include, but is not limited to, a frequency shift keying (FSK) modulation method, a Manchester coding modulation method, a phase shift keying (PSK) modulation method, a pulse width modulation method, a differential biphase modulation method, etc.

When the signal received through the transmission coil is detected, the demodulator 632 may demodulate and transmit the detected signal to the controller 640. Here, the demodulated signal may include, but is not limited to, a signal strength indicator, an error correction (EC) indicator for power control during wireless power transmission, an end of charge (EOC) indicator, an overvoltage/overcurrent indicator, etc. and may further include a variety of status information for identifying the status of the wireless power receiver.

In addition, the demodulator 632 may identify through which transmission coil the demodulated signal is received, and provide a predetermined transmission coil identifier corresponding to the identified transmission coil to the controller 640.

In addition, the demodulator 632 may demodulate the signal received through the transmission coil 623 and transmit the demodulated signal to the controller 640. For example, the demodulated signal may include, but is not limited to, a signal strength indicator and the demodulated signal may include a variety of status information of the wireless power receiver.

For example, the wireless power transmitter 600 may acquire the signal strength indicator through in-band communication for performing communication with the wireless power receiver using the same frequency as used for wireless power transmission.

In addition, the wireless power transmitter 600 may not only transmit wireless power through the transmission coil unit 622 but also exchange a variety of control signals and status information with the wireless power receiver through the transmission coil unit 622. In another example, the wireless power transmitter 600 may further include separate coils respectively corresponding to the first to n-th transmission coils of the transmission coil unit 622 and perform in-band communication with the wireless power receiver using the separate coils.

Although the wireless power transmitter 600 and the wireless power receiver perform in-band communication in the description of FIG. 6, this is merely exemplary and short-range bidirectional communication may be performed through a frequency band different from a frequency band used to transmit the wireless power signal. For example, short-range bidirectional low-energy communication may be any one of Bluetooth communication, RFID communication, UWB communication and ZigBee communication.

In addition, although the power transmission unit 620 of the wireless power transmitter 600 includes the multiplexer 621 and the plurality of transmission coils 622 in the description of FIG. 6, this is merely an example. It should be noted that the power transmission unit 620 according to another embodiment may include one transmission coil.

Figure 7:
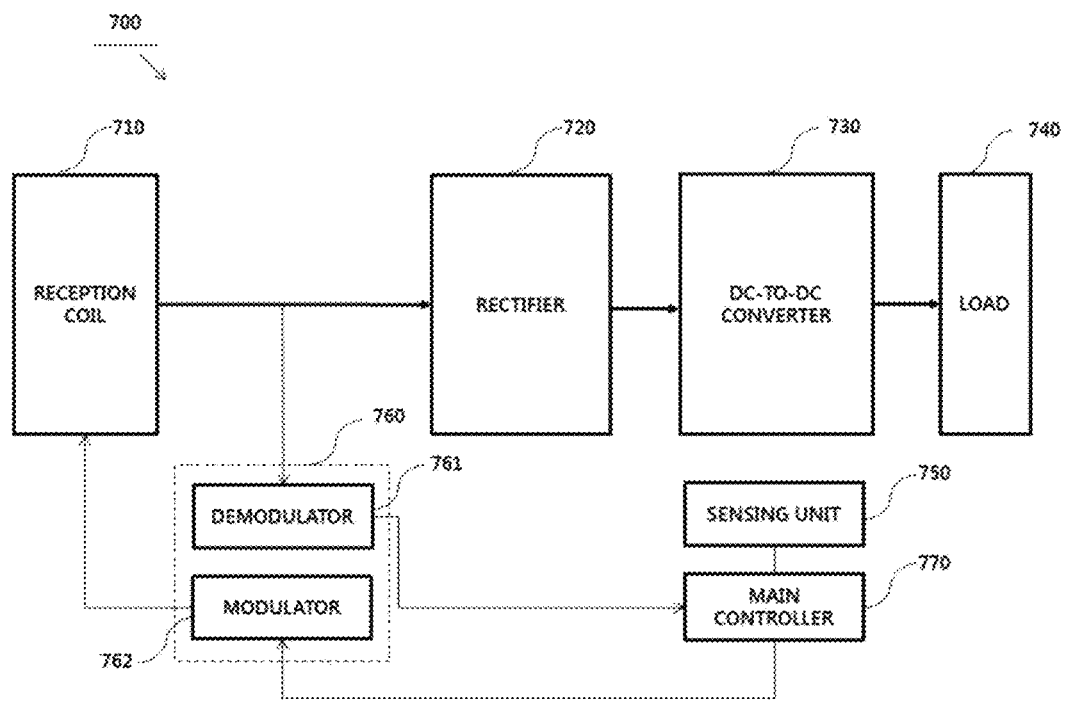
FIG. 7 is a block diagram illustrating the structure of a wireless power receiver interworking with the wireless power transmitter shown in FIG. 6.

FIG. 7 is a block diagram illustrating the structure of a wireless power receiver interworking with the wireless power transmitter shown in FIG. 6.

Referring to FIG. 7, the wireless power receiver 700 may include a reception coil 710, a rectification unit 720, a DC-to-DC converter 730, a load 740, a sensing unit 750, a communication unit 760, and a main controller 770. The communication unit 760 may include a demodulator 761 and a modulator 762.

Although the wireless power receiver 700 shown in the example of FIG. 7 is shown as exchanging information with the wireless power transmitter 600 through in-band communication, this is merely exemplary and the communication unit 760 according to another embodiment may provide short-range bidirectional communication through a frequency band different from a frequency band used to transmit a wireless power signal.

AC power received through the reception coil 710 may be transmitted to the rectification unit 720. The rectification unit 720 may convert the AC power into DC power and transmit the DC power to the DC-to-DC converter 730. The DC-to-DC converter 730 may convert the strength of the DC power output from the rectifier into a specific strength required by the load 740 and transmit the converted power to the load 740.

The sensing unit 750 may measure the strength of the DC power output from the rectification unit 720 and provide the strength to the main controller 770. In addition, the sensing unit 750 may measure the strength of current applied to the reception coil 710 according to wireless power reception and transmit the measured result to the main controller 770. In addition, the sensing unit 750 may measure the internal temperature of the wireless power receiver 700 and provide the measured temperature value to the main controller 770.

For example, the main controller 770 may compare the strength of the DC power output from the rectifier with a predetermined reference value and determine whether overvoltage occurs. Upon determining that overvoltage occurs, a predetermined packet indicating that overvoltage has occurred may be generated and transmitted to the modulator 762. The signal modulated by the modulator 762 may be transmitted to the wireless power transmitter 600 through the reception coil 710 or a separate coil (not shown). If the strength of the DC power output from the rectifier is equal to or greater than the predetermined reference value, the main controller 770 may determine that a detection signal is received and perform control to transmit a signal strength indicator corresponding to the detection signal to the wireless power transmitter 600 through the modulator 762 upon receiving the detection signal. In another example, the demodulator 761 may demodulate the AC power signal between the reception coil 710 and the rectification unit 720 or the DC power signal output from the rectification unit 720, identify whether a detection signal is received, and provide the identified result to the main controller 770. At this time, the main controller 770 may perform control to transmit the signal strength indicator corresponding to the detection signal through the modulator 762.

Figure 8:
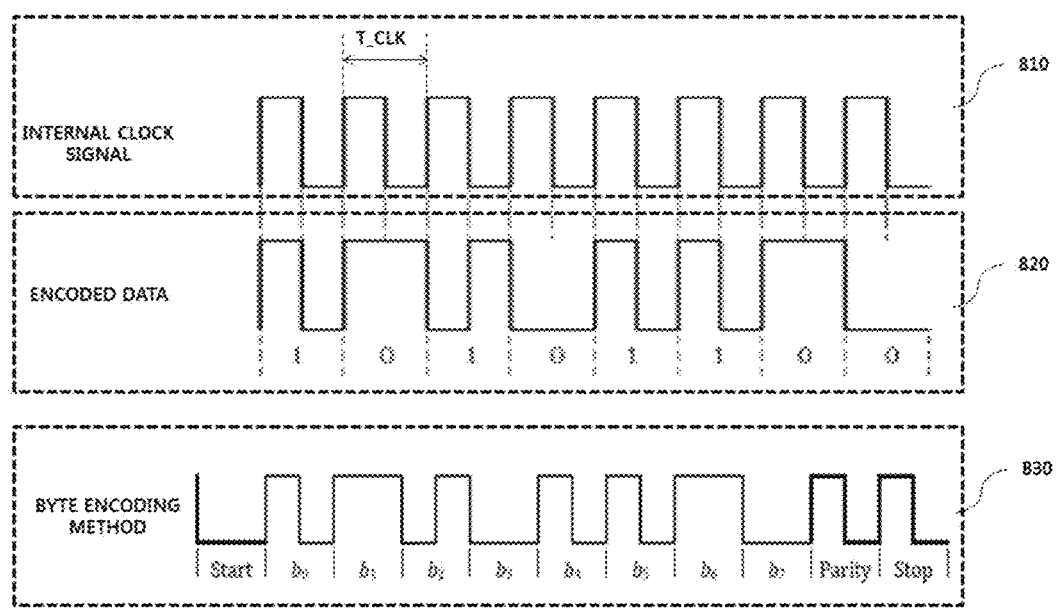
FIG. 8 is a view illustrating a method of modulating and demodulating a wireless power signal according to an embodiment.

FIG. 8 is a view illustrating a method of modulating and demodulating a wireless power signal according to an embodiment.

As denoted by reference numeral 810 of FIG. 8, the wireless power transfer end 10 and the wireless power reception end 20 may encode or decode a packet to be transmitted based on an internal clock signal having the same period.

Hereinafter, the method of encoding the packet to be transmitted will be described in detail with reference to FIGS. 1 to 8.

Referring to FIG. 1, if the wireless power transfer end 10 or the wireless power reception end 20 does not transmit a specific packet, the wireless power signal may be an unmodulated AC signal having a specific frequency as denoted by reference numeral 41 of FIG. 1. In contrast, if the wireless power transfer end 10 or the wireless power reception end 20 transmits a specific packet, the wireless power signal may be an AC signal modulated using a specific modulation method as denoted by reference numeral 42 of FIG. 1. For example, the modulation method may include, but is not limited to, an amplitude modulation method, a frequency modulation method, a frequency and amplitude modulation method, a phase modulation method, etc.

Differential biphase encoding is applicable to binary data of the packet generated by the wireless power transfer end 10 or the wireless power reception end 20 as denoted by reference numeral 820. Specifically, differential biphase encoding has two state transitions to encode data bit 1 and one state transition to encode data bit 0. That is, data bit 1 is encoded such that transition between a HI state and a LO state occurs in a rising edge and a falling edge of the clock signal and data bit 0 is encoded such that transition between a HI state and a LO state occurs in a rising edge of the clock signal.

A byte encoding method denoted by reference numeral 830 is applicable to the encoded binary data. Referring to reference numeral 830, the byte encoding method according to the embodiment may be a method of inserting a start bit and a stop bit for identifying start and stop of the bit stream with respect to the 8-bit encoded binary bit stream and a parity bit for sensing whether an error of the bit stream (byte) occurs.

Figures 9, 10:
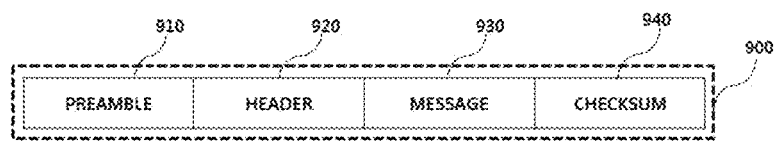
FIG. 9 is a view illustrating a packet structure according to an embodiment.
FIG. 10 is a view illustrating the types of packets transmitted from a wireless power receiver to a wireless power transmitter according to an embodiment.

FIG. 9 is a view illustrating a packet format according to an embodiment.

Referring to FIG. 9, the packet format 900 used for information exchange between the wireless power transfer end 10 and the wireless power reception end 20 may include a preamble 910 field for acquiring synchronization for demodulation of the corresponding packet and identifying an accurate start bit of the corresponding packet, a header 920 field for identifying the type of a message included in the corresponding packet, a message 930 field for transmitting the content (or payload) of the corresponding packet, and a checksum 940 field for identifying whether an error has occurred in the corresponding packet.

As shown in FIG. 9, a packet reception end may identify the size of the message 930 included in the corresponding packet based on the value of the header 920.

In addition, the header 920 may be defined for each step of the wireless power transfer procedure, and the value of the header 920 may be defined as the same value in different phases. For example, referring to FIG. 9, it should be noted that the header value corresponding to end power transfer of the ping phase and end power transfer of the power transfer phase is 0x02.

The message 930 includes data to be transmitted by the transmission end of the corresponding packet. For example, the data included in the message 930 field may be a report, a request, or a response, without being limited thereto.

The packet 900 according to another embodiment may further include at least one of transmission end identification information for identifying the transmission end for transmitting the corresponding packet and reception end identification information for identifying the reception end for receiving the corresponding packet. The transmission end identification information and the reception end identification may include IP address information, MAC address information, product identification information, etc. However, the present disclosure is not limited thereto and information for distinguishing the reception end and the transmission end in the wireless charging system may be included.

The packet 900 according to another embodiment may further include predetermined group identification information for identifying a reception group if the corresponding packet is received by a plurality of apparatuses.

FIG. 10 is a view illustrating the types of packets transmitted from the wireless power receiver to the wireless power transmitter according to an embodiment.

Referring to FIG. 10, the packet transmitted from the wireless power receiver to the wireless power transmitter may include a signal strength packet for transmitting the strength information of a detected ping signal, a power transfer type (end power transfer) for requesting power transfer end from the transmitter, a power control hold-off packet for transferring time information waiting until actual power is controlled after a control error packet for control is received, a configuration packet for transferring configuration information of the receiver, an identification packet and an extended identification packet for transmitting receiver identification information, a general request packet for transmitting a general request message, a specific request packet for transmitting a specific request message, an FOD status packet for transmitting a reference quality factor value for FO detection, a control error packet for controlling power transmitted by the transmitter, a renegotiation packet for starting renegotiation, a 24-bit received power packet for transmitting the strength information of the received power, and a charge status packet for transmitting the current charging status information of the load.

The packets transmitted from the wireless power receiver to the wireless power transmitter may be transmitted using in-band communication using the same frequency band as the frequency band used to transmit wireless power.

Figure 11:
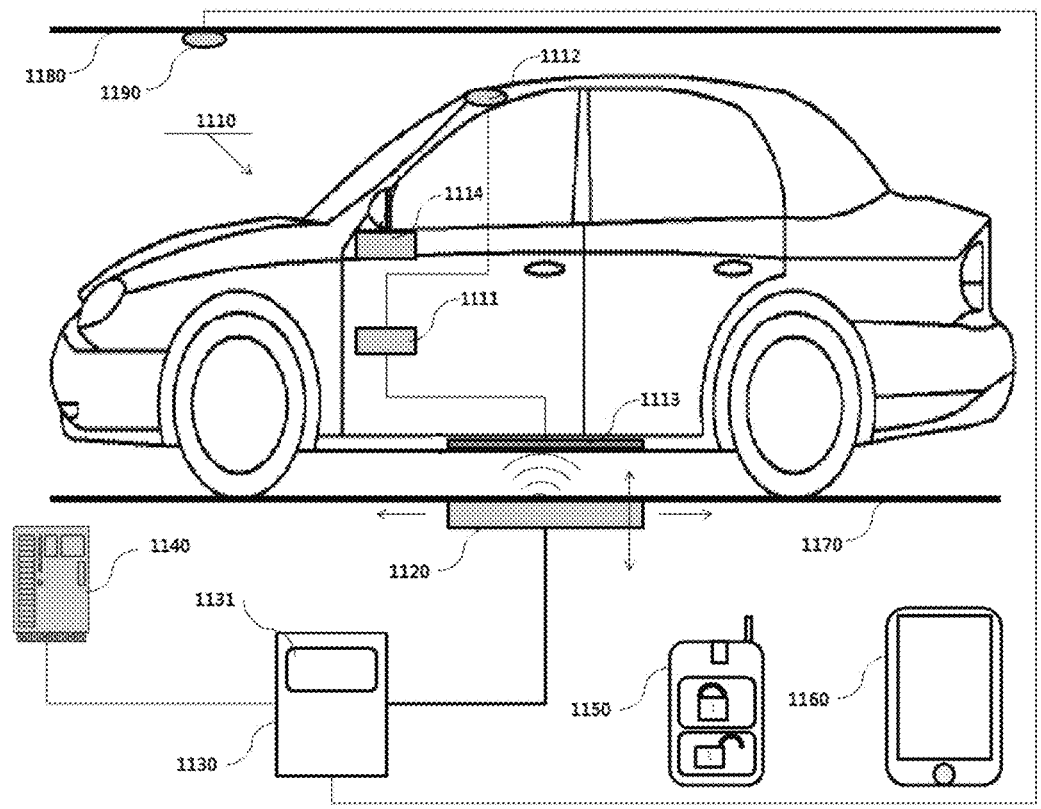
FIG. 11 is a view illustrating the configuration of a wireless charging system for a transportation apparatus according to an embodiment.

FIG. 11 is a view illustrating the configuration of a wireless charging system for a transportation apparatus according to an embodiment.

The wireless charging system and the wireless charging method according to the embodiment are applicable to means of transportation such as electric vehicles. For example, the means of transportation may include an electric vehicle, an electric bicycle, an electric two-wheeled vehicle, an electric cart, a drone, etc., without being limited thereto.

Hereinafter, in the embodiment, a wireless charging system capable of minimizing damage caused by electromagnetic waves when the means of transportation is an electric vehicle will be described in detail.

Referring to FIG. 11, a wireless power reception device 1113 may be mounted on one side of an electric vehicle 1110, for example, a lower end of the electric vehicle. The wireless power reception device 1113 may be connected to a specific controller 1111 of the vehicle to exchange a variety of control and status information. For example, the wireless power reception device 1113 may receive at least one of ON/OFF status information of the vehicle, opening/closing status information of a vehicle door, boarding status information or safety status information from the controller 1111. Here, whether the vehicle door is open or closed may be detected by the controller 1111 using a signal according to button operation of a smart key 1150. This is merely an example and whether the vehicle door is open or closed may be detected by the controller 1111 according to actual user operation of opening/closing the door.

For example, the boarding status information may be generated by the controller 1111 based on at least one of pressure sensing information collected from pressure sensors mounted in seats provided in the vehicle, opening/closing sensing information of doors of the vehicle, or an image captured by a camera, for example, without being limited to, a black box camera, provided in the vehicle.

In another example, the boarding status information may be generated based on sensing information collected from a sensing device 1190 connected to a wireless power transmission device 1120. For example, the sensing information collected from the sensing device 1190 may include at least one of infrared sensing information, image sensing information through analysis of an image captured by a camera sensor, or motion sensing information detected by a motion detection sensor, without being limited thereto, and any information collectable by the sensing device 1190 may be used in order to determine whether a driver has exited the vehicle.

The boarding status information may be exchanged through a communication channel established between the wireless power reception device 1113 and the wireless power transmission device 1120.

In addition, the safety status information may be collected by at least one of the wireless power reception device 1113 or the wireless power transmission device 1120. At this time, the collected safety status information may be exchanged through the communication channel established between the wireless power reception device 1113 and the wireless power transmission device 1120.

The wireless power reception device 1113 may detect that the wireless power transmission device 1120 is present, when a wireless power signal, for example, without being not limited to, a ping signal, is detected. At this time, the wireless power reception device 1113 may transmit a predetermined control signal indicating that the wireless power transmission device 1120 has been detected (hereinafter referred to as a transmitter detection signal for convenience of description) to the controller 1111. When the transmitter detection signal is received, the controller 1111 may collect the sensing information from at least one sensor 1112 mounted in the vehicle and determine a boarding status based on the collected sensing information. At this time, the determined boarding status information may be transmitted to the wireless power reception device 1113.

The controller 1111 may start collection of the sensing information from the sensor 1112 based on at least one of a startup status or a stop status of the vehicle. For example, the controller 1111 may start sensing information collection operation in order to check a boarding status when the vehicle is powered off or when the speedometer of the vehicle is completely stopped. For example, the boarding status may be determined based on the sensing information collected from the pressure detection sensor provided on one side of a vehicle seat. In another example, the boarding status may be determined by analyzing the image captured by the camera provided in the vehicle. In another embodiment, the boarding status may be determined based on the sensing information collected from the infrared sensor provided in the vehicle.

Upon determining that all persons have exited the vehicle based on the received boarding status information, the wireless power reception device 1113 may perform control or negotiation to establish communication with the wireless power transmission device 1120 and then to receive power having a first strength from the wireless power transmission device 1120. For example, the power having the first strength may be maximum power which is not harmful to the human body (hereinafter referred to as low power, for convenience of description). In another example, the low power may be minimum power necessary for operation of specific devices mounted in the vehicle. Here, the specific device may include at least one of a wireless power reception device, a vehicle head unit, indoor lighting, an air conditioner, etc., without being limited thereto. It should be noted that the type of the target device varies according to the design purposes of those skilled in the art.

Upon determining that all passengers have exited the vehicle, the wireless power reception device 1113 may determine whether all the passengers have moved to a safe area. Whether the passengers have moved to the safe area may be determined based on a distance from the vehicle.

In a first embodiment, the wireless power reception device 1113 may determine whether the passengers who have exited the vehicle have moved to the safe area using a predetermined sensor provided on one side of the vehicle. For example, the wireless power reception device 1113 may check the positions and (or) directions of the persons who have exited the vehicle using an infrared sensor, analyze the reflected patterns of lasers or ultrasonic waves transmitted to the checked positions, and measure distances from the vehicle to the persons. When the measured distances exceed a reference value, that is, upon determining that the persons have moved to the safe area, the wireless power reception device 1113 may request transmission of power having a second strength from the wireless power transmission device 1120. Here, the power having the second strength is high power, is greater than the power having the first strength, and has a high charging speed.

Although, in the first embodiment, the wireless power reception device 1113 directly determines whether the passengers who have exited the vehicle have moved to the safe area and requests switching to high power from the wireless power transmission device 1120 according to the result of determination, this is merely an example. In a second embodiment, the wireless power transmission device 1120 may determine whether the passengers have moved to the safe area and directly switch from low power to high power according to the result of determination.

Specifically, in the second embodiment, the wireless power reception device 1113 may determine whether the passengers who have exited the vehicle have moved to the safe area based on the sensing information collected from a predetermined sensor mounted outside the vehicle. As shown in FIG. 11, whether the passengers who have exited the vehicle have moved to the safe area determined based on the safety status information detected by a distance detection sensor 1190 mounted on a wall, for example, a ceiling, of a garage or a parking lot may be transmitted to the wireless power transmission device 1120 through a power meter 1130. The wireless power transmission device 1120 may determine whether high power transmission is possible based on the received safety status information. Upon determining that high power transmission is possible, the wireless power transmission device 1120 may change the strength of the transmitted power from low to high.

An alarm unit may be provided on one side of the power meter 1130 or the wireless power transmission device 1120 according to the embodiment. When movement to the safe area is not determined before a predetermined time has elapsed after low-power charging starts, the wireless power transmission device 1120 may perform control to output a predetermined warning alarm guiding movement to the safe area through the alarm unit. Here, the warning alarm may include at least one of alarm sound through a beeper, a voice message through a speaker, an LED illumination, or a text message through a display screen.

The power meter 1130 or the wireless power transmission device 1120 according to another embodiment may determine whether the passengers who have exited the vehicle have moved to the safe area based on the safety status information received from the distance detection sensor 1190. Upon determining that the passengers have not moved to the safe area during a predetermined time after low-power charging starts, the power meter 1130 or the wireless power transmission device 1120 may transmit a predetermined warning alarm request including receiver identification information corresponding to the wireless power reception device 1113 to a server 1140. For example, the server 1140 may be a telematics server, without being limited thereto.

The server 1140 may transmit a predetermined warning text message to a pre-registered contact in correspondence with the receiver identification information. For example, the warning text message may be "Please move to a safe area for fast and safe vehicle charging!"

For example, when Bluetooth pairing between the vehicle head unit 1114 and the smartphone 1160 of a passenger is completed, the vehicle head unit 1114 may automatically access the server 1140 to register the phone number of the Bluetooth-paired smartphone as a contact corresponding to the receiver identification information.

In addition, receiver identification information corresponding to a vehicle identification number and (or) a vehicle license number may be pre-registered and maintained in the server 1140. The power meter 1130 may measure the amount of power charged in correspondence with the receiver identification information and transmit the receiver identification information and information on the amount of charged power to the server 1140 when charging is completed. The server 1140 may calculate an electric rate based on the amount of charged power and a predetermined electric rate per unit power and transmit the calculated electric rate to the power meter 1130. Thereafter, the driver may pay a charging fee using a payment device (which may include at least one of a cash payment device or a card payment device) provided in the power meter 1130.

In addition, household address information or (and) householder information corresponding to the vehicle identification number or (and) the vehicle license number may be pre-registered in the server 1140.

In this case, when the electric rate information is received from the server 1140 after charging is completed, the power meter 1130 may output a payment method through a display screen 1131 provided by configuring a predetermined user interface screen. The payment method may include an immediate payment method and a deferred payment method. For example, the immediate payment method may include credit card payment, cash payment, etc. The deferred payment method may include a payment method of adding the calculated electric rate to a household electric bill and a payment method of adding the calculated electric rate to a mobile communication bill. When the deferred payment method is selected, the server 1140 may generate billing data of each receiver identification device such that the calculated electric rate is added to the bill, for example, the household electric bill or the mobile communication bill. The generated billing data may be automatically transmitted to the relevant organization or provider, for example, Korean Electric Power Corporation (KEPCO) or a mobile carrier on a corresponding date every month through a wired or wireless communication network.

The wireless power transmission device 1120 according to one embodiment may perform alignment with the wireless power reception device 1113, for example, alignment of transmission/reception antennas, in order to maximize charging efficiency. When the vehicle is completely stopped, the wireless power transmission device 1120 may perform alignment operation based on charging efficiency calculated in real time. Here, the charging efficiency may be calculated based on the strength of power received by the wireless power reception device 1113 as compared to the strength of the power transmitted by the wireless power transmission device 1120, without being limited thereto. To this end, the wireless power transmission device 1120 may further include a driving device which is two-dimensionally (x/y-axis) or three-dimensionally (x/y/z-axis) movable along the ground 1170. For example, the driving device may include a motor, a rail, a ball bush, a drive wheel, a drive belt, a stop switch, etc. For example, the driving device may be implemented similarly to the driving principle of an FDM (Fused Deposition Modeling) 3D printer or a CNC (Computer Numerical Control) device, without being limited thereto.

The wireless power reception device 1113 according to one embodiment may be driven by the controller 1111. For example, the controller 1111 may perform control to apply power to the wireless power reception device 1113, according to predetermined user interface input, for example, operation of a switch or button provided on one side of a center fascia, selection of a predetermined menu on the user interface screen of the vehicle head unit 1114, etc. In another example, when the vehicle is completely stopped, the controller 1111 may perform control to apply power to the wireless power reception device 1113.

Figure 12:
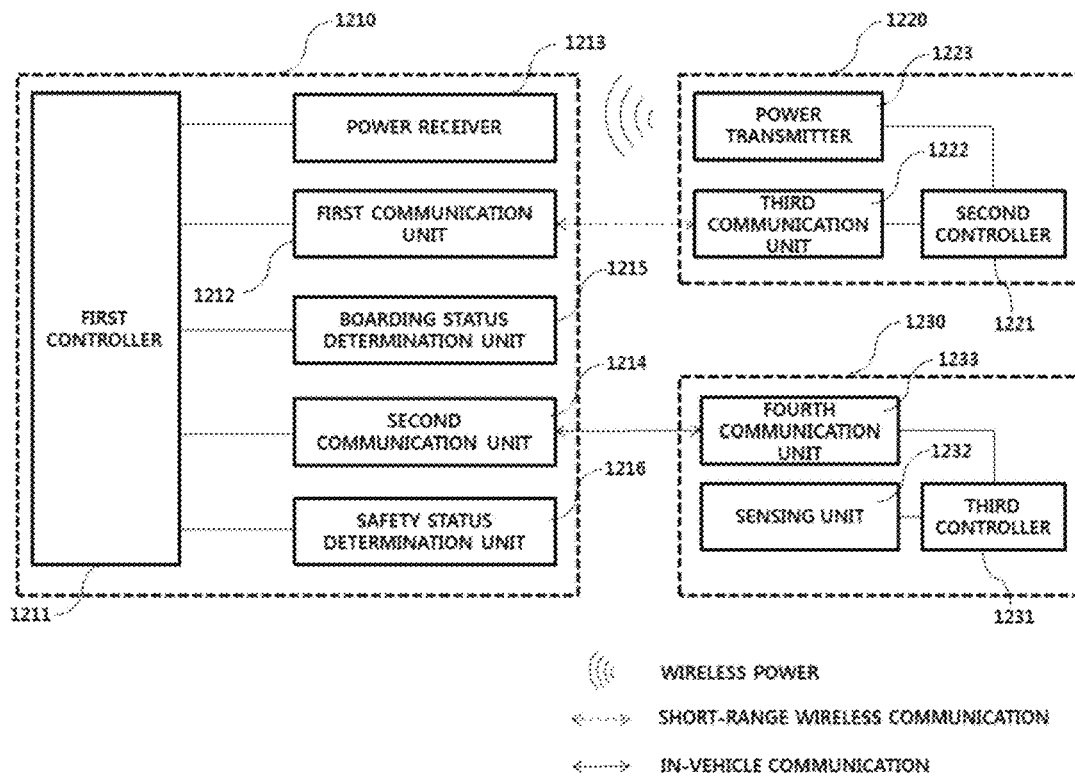
FIG. 12 is a block diagram illustrating wireless power control operation in a wireless charging system for a transportation apparatus according to another embodiment.

FIG. 12 is a block diagram illustrating wireless power control operation in a wireless charging system for a transportation apparatus according to another embodiment.

Referring to FIG. 12, the wireless charging system may include a wireless power reception device 1210, a wireless power transmission device 1220 and a vehicle controller 1230.

The wireless power reception device 1210 and the vehicle controller 1230 are mounted in an electric vehicle and may be connected through in-vehicle communication. Here, in-vehicle communication may include CAN (Controller Area Network) communication, FlexRay, LIN (Local Interconnect Network) communication, Ethernet communication, etc., without being limited thereto.

The wireless power transmission device 1220 may wirelessly transmit power to the wireless power reception device 1210 and dynamically control the strength of the transmitted power depending on whether passengers have exited the electric vehicle and whether the passengers are in a safety status.

For example, the wireless power transmission device 1220 may perform control to transmit high power upon determining that all passengers have exited the electric vehicle and moved to a safe area.

The wireless power reception device 1210 may include a first controller 1211, a power receiver 1213, a first communication unit 1212, a boarding status determination unit 1215, a second communication unit 1214 and a safety status determination unit 1216.

The wireless power transmission device 1220 may include a second controller 1221, a third communication unit 1222 and a power transmitter 1223.

The vehicle controller 1230 may include a third controller 1231, a sensing unit 1232 and a fourth communication unit 1233. Here, it should be noted that the sensing unit 1232 is physically spaced apart from the vehicle controller 1230 and is connected to the vehicle controller through the in-vehicle communication. To this end, predetermined in-vehicle communication hardware and software may be installed in the sensing unit 1232 and the third controller 1231.

The first communication unit 1212 and the third communication unit 1222 may perform short-range wireless communication. For example, short-range wireless communication may be any one of Bluetooth communication, wireless Internet (Wi-Fi) communication, NFC (Near Field Communication) communication, or RFID (Radio Frequency Identification) communication, without being limited thereto.

The second communication unit 1214 and the fourth communication unit 1230 may be connected through an in-vehicle communication network.

The first controller 1211 may control overall operation of the wireless power reception device 1210 and communication with an external device.

Operation of the first controller 1211 will become more apparent through the following description.

The wireless power receiver 1213 may rectify AC power received through a receive antenna, generate DC power and supply the generated DC power to a load (not shown), that is, a battery, provided in the electric vehicle.

The first controller 1211 may compare the strength of power received through the wireless power receiver 1213 with a predetermined reference value to determine whether the wireless power transmission device 1220 is present.

Upon determining that the wireless power transmission device 1220 is present, the first controller 1211 may establish short-range wireless communication with the wireless power transmission device 1220 through the first communication unit 1214.

When short-range wireless communication is established, the first controller 1211 may request low-power transmission from the wireless power transmission device 1220.

The first controller 1211 may receive boarding status information through the second communication unit 1214. Here, the boarding status information may include at least one of information on the detected strength of pressure applied to each seat, information on an image captured by a camera or infrared sensing information, without being limited thereto. Any sensing information capable of determining whether the passenger has exited the vehicle may be used.

When the boarding status information is received, the first controller 1211 may transmit the boarding status information to the boarding status determination unit 1215.

The boarding status determination unit 1215 may determine whether all persons have exited the vehicle based on the received boarding status information and transmit the result of determination to the first controller 1211.

Upon determining that all passengers have exited the vehicle, the first controller 1211 may receive safety status information from the vehicle controller 1230 through the second communication unit 1214. Here, the safety status information may be information for identifying the current positions of the persons who have exited the vehicle. For example, the safety status information may be a distance from the wireless power reception device 1210 to the persons who have exited the vehicle, without being limited thereto.

The first controller 1211 may transmit the received safety status information to the safety status determination unit 1216.

The safety status determination unit 1216 may determine whether high-power reception is possible based on the safety status information. Upon determining that high-power reception is possible, that is, when the distance exceeds a predetermined safe distance, the safety status determination unit 1216 may transmit a predetermined first control signal indicating that the safe distance for high-power reception is secured to the first controller 1211. In contrast, upon determining that high-power reception is impossible, that is, the distance is less than the predetermined safe distance, the safety status determination unit 1216 may transmit a predetermined second control signal indicating that the safe distance for high-power reception is not secured to the first controller 1211.

When the first control signal is received, the first controller 1211 may transmit a predetermined power control signal for requesting high-power transmission to the wireless power transmission device 1220 through the first communication unit 1212.

In contrast, when the first control signal is received, the first controller 1211 may transmit the continuously received safety status information to the safety status determination unit 1216.

Although the method of, at the wireless power reception device 1210, requesting high-power transmission from the wireless power transmission device 1220 when the safe distance is secured is described in the above embodiment, this is merely an example and the first controller 1211 may transmit a predetermined power control signal to the wireless power transmission device 1220 to control the strength of power according to distance. Therefore, in the embodiment, by more precisely and accurately controlling power according to the distances between the vehicle and the passengers who have exited the vehicle, it is possible to shorten a charging time.

When short-range wireless communication with the wireless power reception device 1210 is established through the third communication unit 1222, the second controller 1221 may start transmission of predetermined initial power, that is, low power, which is not harmful to the human body.

In addition, when the predetermined power control signal for requesting high-power transmission is received from the wireless power reception device 1210 through the third communication unit 1222 during low-power transmission, the second controller 1221 may control the power transmitter 1220 to transmit high power.

The third controller 1231 may collect the boarding status information and the safety status information through the sensing unit 1232 according to the request of the wireless power reception device 1210. At this time, the collected information may be transmitted to the wireless power reception device 1210 through the fourth communication unit 1233. The boarding status information and the safety status information may be periodically transmitted. However, this is merely an example and the boarding status information and the safety status information may be transmitted only when the status is changed by a predetermined reference value or more, in order to minimize the network load of the in-vehicle communication network.

Although the wireless power reception device 1210 determines whether the passengers have exited the vehicle and moved to the safe area based on the boarding status information and the safety status information in the embodiment of FIG. 12, this is merely an example. In another embodiment, the wireless power transmission device 1220 may determine whether the passengers have exited the vehicle and moved to the safe area in conjunction with the sensor. In this case, the wireless power transmission device 1220 may dynamically control the strength of the transmitted power according to the result of determining the safety status.

In another example, the wireless power reception device 1210 may acquire the boarding status information from the vehicle controller 1230 to determine that all passengers have exited the vehicle. At this time, when a predetermined control signal indicating that all passengers have exited the vehicle is received from the wireless power reception device 1210, the wireless power transmission device 1220 may collect the safety status information and determine switching to high power. At this time, when switching to high power is determined, the wireless power transmission device 1220 may transmit a predetermined power control signal indicating switching to high power to the wireless power reception device 1210 through the second communication unit 1222. When the power control signal indicating switching to high power is received, the first controller 1211 of the wireless power reception device 1210 may switch the operation mode of the power receiver 1213 from a low-power reception mode to a high-power reception mode. For example, a reference value for determining overvoltage, overcurrent, overheat, etc. may be differently set according to the operation mode. In addition, a used hardware configuration may vary according to the operation mode. In this case, the first controller 1211 may switch the hardware configuration through a control unit such as a switch.

Figure 13:
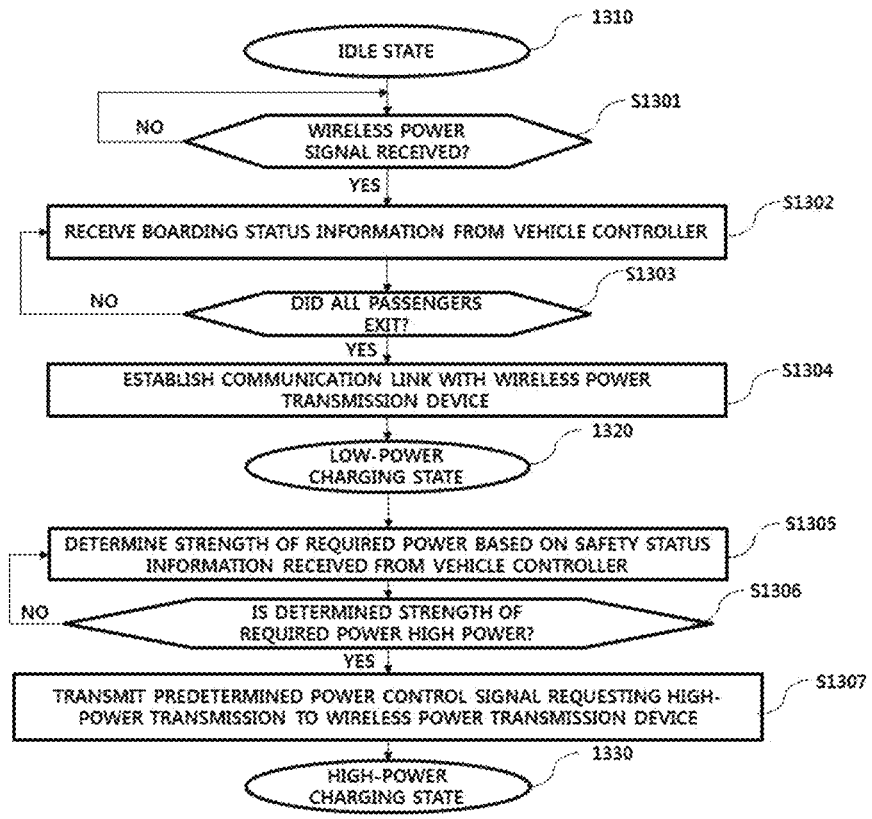
FIG. 13 is a flowchart illustrating a wireless power reception method at a wireless power reception device mounted in a transportation apparatus according to an embodiment.

FIG. 13 is a flowchart illustrating a wireless power reception method at a wireless power reception device mounted in a transportation apparatus according to an embodiment.

Referring to FIG. 13, the wireless power reception device may determine whether a wireless power signal is being received in an idle state 1310 (S1301). Here, the wireless power signal may be a ping signal or a beacon signal transmitted by a wireless power transmission device in order to detect an object and identify a receiver.

Upon determining that the wireless power signal having a predetermined strength or more is detected, the wireless power reception device may receive the boarding status information from a controller (hereinafter referred to as a vehicle controller, for convenience of description) mounted in the transportation apparatus (S1302). For example, the boarding status information may be received from the vehicle controller at the request of the wireless power reception device after reception of the wireless power signal is detected.

The wireless power reception device may determine whether all passengers have exited the vehicle based on the boarding status information (S1303).

Upon determining that all passengers have exited the vehicle, the wireless power reception device may establish a communication link with the wireless power transmission device (S1304). Here, the communication link may be an in-band communication link. However, this is merely an example and, in another embodiment, the communication link may be a short-range wireless communication link.

When communication with the wireless power transmission device is normally completed, the wireless power reception device may receive a low-power signal and enter a low-power charging state 1320. At this time, upon entering the low-power charging state 1320, the wireless power reception device may request transmission of the safety status information from the vehicle controller.

The wireless power reception device may determine the strength of required power based on the safety status information received from the vehicle controller (S1305).

For example, the wireless power reception device may determine whether all the passengers who have exited the vehicle have moved to a safe area based on the safety status information.

Upon determining that all the passengers who have exited the vehicle have moved to the safe area, the wireless power reception device may determine the strength of the required power to be high power. In contrast, upon determining that all the passengers who have exited the vehicle have not moved to the safe area, the wireless power reception device may determine the strength of the required power to be low power.

The wireless power reception device may determine whether the determined strength of the required power is high power (S1306).

Upon determining that the determined strength of the required power is high power, the wireless power reception device may transmit a predetermined power control signal for requesting high-power transmission to the wireless power transmitter (S1307). At this time, the wireless power reception device may enter a high-power charging state (1330).

Upon determining that the determined strength of the required power is low power, the wireless power reception device may not transmit a separate power control signal and may perform step 1305.

Although the wireless power reception device establishes the communication link with the wireless power transmission device after determining that all passengers have exited the vehicle in the embodiment of FIG. 13, this is merely an embodiment. A wireless power reception device according to another embodiment may immediately establish the communication link with the wireless power transmission device and then enter the low-power charging state, when the wireless power signal is detected. Thereafter, the boarding status information and the safety status information may be received from the vehicle controller to determine whether all passengers who have exited the vehicle have moved to a safe area. Upon determining that all passengers have moved to the safe area, the wireless power reception device may transmit a predetermined power control signal for requesting high-power transmission to the wireless power transmission device.

Figure 14:
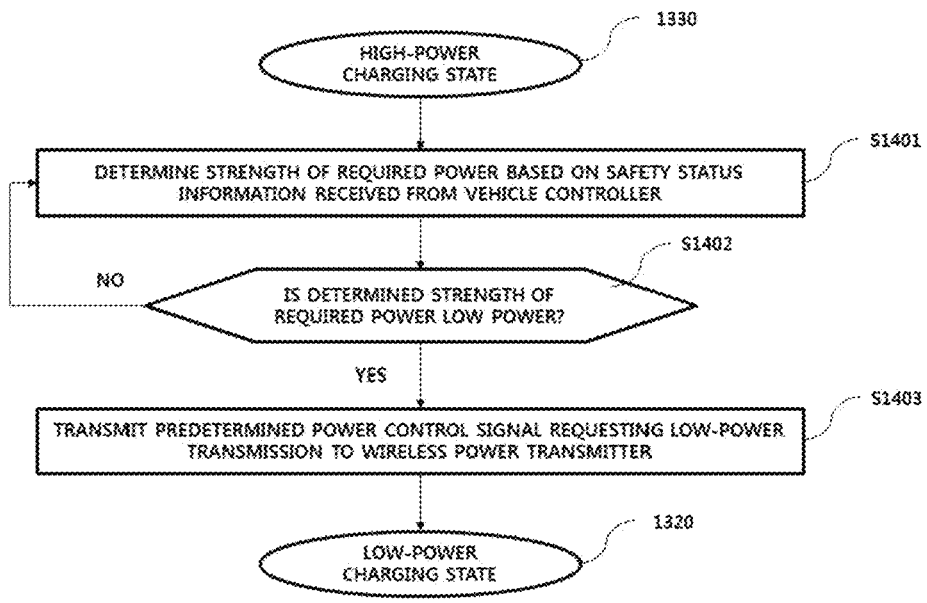
FIG. 14 is a flowchart illustrating a method of receiving wireless power at a wireless power reception device in a high-power charging state of FIG. 13.

FIG. 14 is a flowchart illustrating a method of receiving wireless power at a wireless power reception device in a high-power charging state of FIG. 13.

Referring to FIG. 14, in the high-power charging state 1330, the wireless power reception device may determine the strength of the required power based on the safety status information received from the vehicle controller (S1401). Here, the safety status information may be periodically received during the high-power charging state or may be received by the wireless power reception device only when the safety status information is changed. For example, when the distance from the vehicle or the wireless power reception device to a passenger, motion of whom is detected, is changed to a predetermined safe distance or less, the vehicle controller may transmit the safety status information including the changed distance information to the wireless power reception device.

The wireless power reception device may determine whether the determined strength of the required power is low power based on the updated safety status information (S1402).

Upon determining that the determined strength of the required power is low power, the wireless power reception device may transmit a predetermined power control signal for requesting low-power transmission to the wireless power transmission device (S1403).

The wireless power reception device may enter the low-power charging state 1320 to perform low-power charging.

Figure 15:
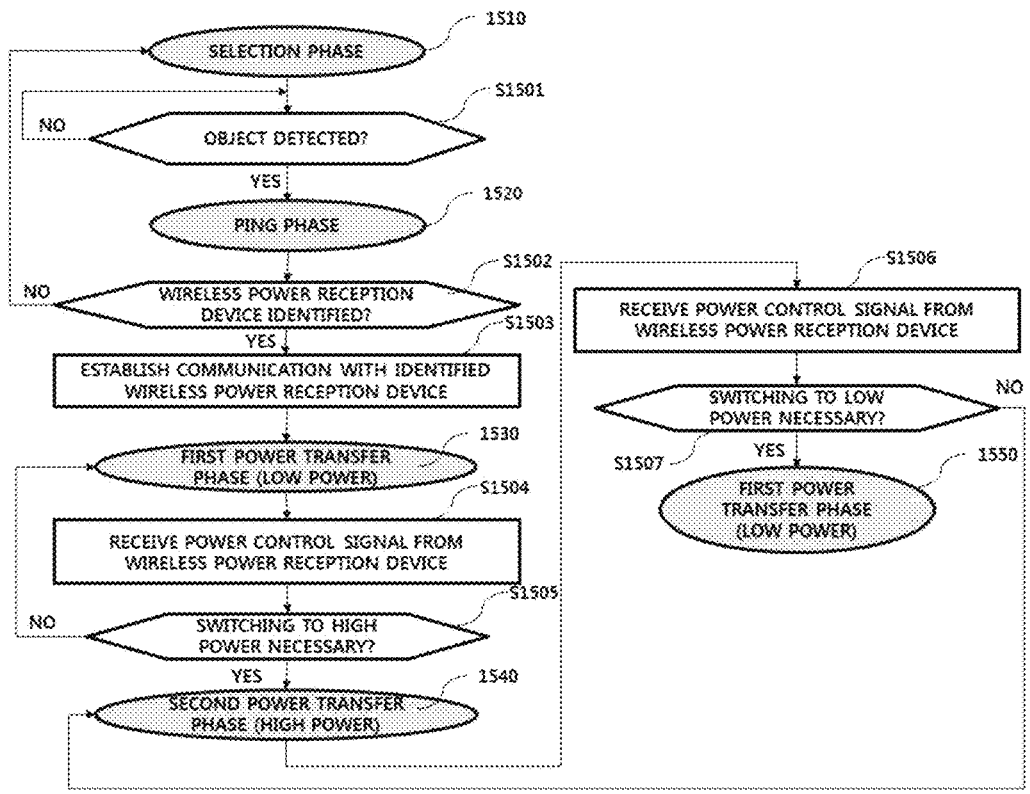
FIG. 15 is a flowchart illustrating a wireless power transmission method at a wireless power transmission device according to an embodiment.

FIG. 15 is a flowchart illustrating a wireless power transmission method at a wireless power transmission device according to an embodiment.

Referring to FIG. 15, in a selection phase 1510, the wireless power transmission device may detect whether an object is present in a charging area (S1501).

When the object is detected, the wireless power transmission device may enter a ping phase 1520 to identify whether the detected object is a wireless power reception device capable of receiving wireless power (S1502).

When the wireless power reception device is identified, the wireless power transmission device may establish communication with the identified wireless power reception device (S1503). The wireless power transmission device may enter a first power transfer phase 1530 to start low-power signal transmission.

While the low-power signal is transmitted, the wireless power transmission device may receive a power control signal from the wireless power reception device (S1504).

The wireless power transmission device may determine whether switching to high power is necessary based on the received power control signal (S1505).

When switching to high power is necessary, the wireless power transmission device may stop low-power signal transmission and enter a second power transfer phase 1540 to start high-power signal transmission.

Upon determining that switching to high power is not necessary in step 1505, the wireless power transmission device may maintain the first power transfer phase 1530.

While the high-power signal is transmitted, the wireless power transmission device may receive a power control signal from the wireless power reception device (S1506).

The wireless power transmission device may determine whether switching to low power is necessary based on the received power control signal (S1507).

Upon determining that switching to low power is necessary, the wireless power transmission device may stop high-power signal transmission and enter the first power transfer phase 1550 to start low-power signal transmission.

For example, the wireless power transmission device may drive a half-bridge inverter for generating a low-power signal and drive a full-bridge inverter for generating a high-power signal. To this end, the wireless power transmission device may include a switch circuit for bridge selection.

Figure 16:
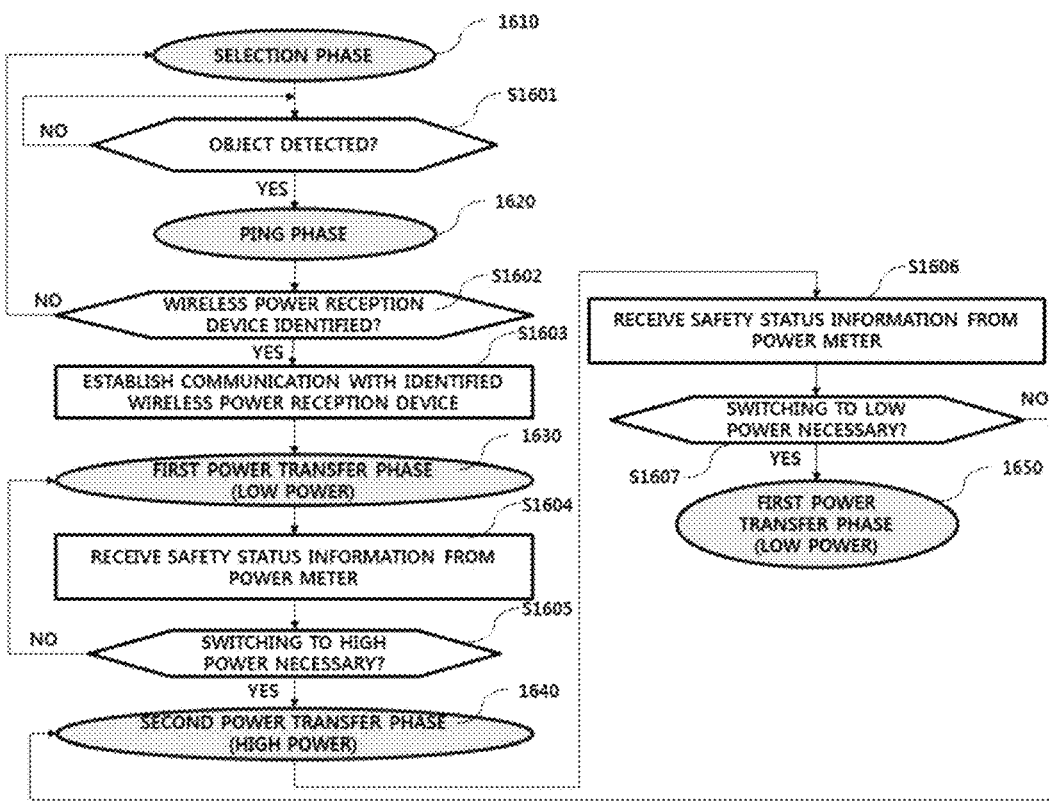
FIG. 16 is a flowchart illustrating a wireless power transmission method at a wireless power transmission device according to another embodiment.

FIG. 16 is a flowchart illustrating a wireless power transmission method at a wireless power transmission device according to another embodiment.

Referring to FIG. 16, in a selection phase 1610, the wireless power transmission device may detect whether an object is present in a charging area (S1601).

When the object is detected, the wireless power transmission device may enter a ping phase 1520 to identify whether the detected object is a wireless power reception device capable of receiving wireless power (S1602).

When the wireless power reception device is identified, the wireless power transmission device may establish communication with the identified wireless power reception device (S1603). The wireless power transmission device may enter a first power transfer phase 1630 to start low-power signal transmission.

While the low-power signal is transmitted, the wireless power transmission device may receive safety status information from a power meter (S1604). Here, the safety status information may be generated by the power meter based on a variety of sensing information received from at least one sensing device connected to the power meter.

Here, the sensing device may include a motion sensor, a distance detection sensor, an infrared sensor, etc., without being limited thereto. For example, presence of a passenger located within a predetermined radius from the vehicle (or the wireless power reception device or the wireless power transmission device) may be determined by the infrared sensor. In addition, the distance between the vehicle (or the wireless power reception device or the wireless power transmission device) and a passenger may be calculated by the distance detection sensor. The safety status information may include information on the calculated distance and the wireless power transmission device may determine whether all passengers have moved to safe positions for high-power transmission based on the received safety status information.

The wireless power transmission device may determine whether switching to high power is possible based on the received safety status information (S1605).

When switching to high power is possible, the wireless power transmission device may stop low-power signal transmission and enter a second power transfer phase 1640 to start high-power signal transmission.

Upon determining that switching to high power is impossible in step 1605, the wireless power transmission device may maintain the first power transfer phase 1630.

While the high-power signal is transmitted, the wireless power transmission device may receive the safety status information from the power meter (S1606). At this time, the safety status information may be periodically received, but this is merely an embodiment. The safety status information may be received only when the safety status information is changed.

The wireless power transmission device may determine whether switching to low power is necessary based on the received safety status information (S1607).

When switching to low power is necessary, the wireless power transmission device may stop high-power signal transmission and enter the first power transfer phase 1650 to start low-power signal transmission.

For example, the wireless power transmission device may drive a half-bridge inverter for generating a low-power signal and drive a full-bridge inverter for generating a high-power signal. To this end, the wireless power transmission device may include a switch circuit for bridge selection.

The method according to the foregoing embodiments may be manufactured as a program executed on a computer and may be stored in a computer-readable recording medium. Examples of the computer-readable recording medium include a ROM, a RAM, a CD-ROM, a magnetic tape, a floppy disk, an optical data storage, etc.

Those skilled in the art will appreciate that the disclosure may be carried out in other specific ways than those set forth herein without departing from the spirit and essential characteristics of the disclosure.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The disclosure relates to wireless charging technology used in a transportation apparatus and is applicable to a wireless charging system for wirelessly transmitting and receiving power.

The invention claimed is:

1. A wireless power reception method of a wireless power reception device for a transportation apparatus having a first sensing device and a controller, the wireless power reception method comprising:
    establishing short-range wireless communication with a wireless power transmission device when a wireless power signal transmitted by the wireless power transmission device is detected in an idle state;
    receiving a first power signal to perform charging;
    receiving safety status information through in-vehicle communication; and
    controlling a strength of received power based on the safety status information, and further including:
    generating with the controller first safety status information based on sensing information received from the first sensing device through the in-vehicle communication;
    transmitting the first safety status information to the wireless power reception device;
    generating at the wireless power transmission device second safety status information based on sensing information received from a second sensing device coupled to the wireless power transmission device and which does not interwork with the transportation apparatus; and
    transmitting the second safety status information to the wireless power reception device through the short-range wireless communication.

2. The wireless power reception method according to claim 1, wherein the controlling of the strength of the received power based on the safety status information includes transmitting a predetermined first power control signal for requesting transmission of a second power signal to the wireless power transmission device through the short-range wireless communication, upon determining that all passengers who have ridden in the transportation apparatus have moved to a safe area based on the second safety status information, the second power signal being higher than the first power signal.

3. The wireless power reception method according to claim 2, wherein the second safety status information includes information on distances between the wireless power reception device and the passengers, and transmission of the second power signal is requested when the distances exceed a predetermined reference value.

4. The wireless power reception method according to claim 2, further comprising:
    receiving a second power signal in response to the first power control signal to perform charging; and
    determining whether switching to the first power is necessary based on the safety status information received from the second sensing device during charging is performed through the second power signal.

5. The wireless power reception method according to claim 4, further comprising transmitting a second power control signal for requesting transmission of the first power signal to the wireless power transmission device, upon determining that switching to the first power is necessary.

6. The wireless power reception method according to claim 1, wherein the second sensing device includes at least one of a motion sensor, a distance detection sensor or an infrared detection sensor.

7. A wireless power reception method of a wireless power reception device for a transportation apparatus, the wireless power reception method comprising:
establishing short-range wireless communication with a wireless power transmission device when a wireless power signal transmitted by the wireless power transmission device is detected in an idle state;
receiving a first power signal to perform charging;
receiving safety status information through in-vehicle communication; and
controlling a strength of received power based on the safety status information, wherein the transportation apparatus includes a first sensing device and a controller,
and further including:
generating with the controller first safety status information based on sensing information received from the first sensing device through the in-vehicle communication,
transmitting the first safety status information to the wireless power reception device, and
determining whether passengers have exited the transportation apparatus before establishing the short-range wireless communication,
wherein, when all passengers have exited, the short-range wireless communication is established.

8. The wireless power reception method according to claim 7, further comprising receiving boarding status information from the controller,
wherein whether the passengers have exited is determined based on the boarding status information.

9. The wireless power reception method according to claim 8, wherein the boarding status information is generated by the controller based on at least one of:
pressure sensing information collected from pressure sensors mounted in seats provided in the transportation apparatus;
opening/closing sensing information of doors provided in the transportation apparatus; or
image sensing information corresponding to images captured by a camera mounted in the transportation apparatus.

10. A wireless power transmission method of a wireless power transmission device, the wireless power transmission method comprising:
identifying a wireless power reception device;
establishing short-range wireless communication with the identified wireless power reception device;
transmitting a first power signal to the wireless power reception device;
receiving a power control signal through the short-range wireless communication; and
controlling a strength of transmitted power based on the power control signal,
wherein the wireless power reception device is mounted in a transportation apparatus having a first sensing device and a controller, and the power control signal is generated based on safety status information collected in correspondence with the transportation apparatus, and
wherein the controller generates first safety status information based on sensing information received from the first sensing device through the in-vehicle communication and transmits the first safety status information to the wireless power reception device; and
further including:
generating second safety status information based on sensing information received from a second sensing device which does not interwork with the transportation apparatus; and
transmitting the second safety status information to the wireless power reception device through the short-range wireless communication.

11. The wireless power transmission method according to claim 10,
wherein, upon determining that all passengers who have ridden in the transportation apparatus have moved to a safe area based on the second safety status information, receiving a predetermined first power control signal for requesting transmission of a second power signal from the wireless power reception device through the short-range wireless communication, and the second power signal is higher than the first power signal.

12. The wireless power transmission method according to claim 11, further comprising controlling the strength of the transmitted power to the first power signal when a second power control signal for requesting switching to the first power signal is received while the second power signal is transmitted.

13. The wireless power transmission method according to claim 10, wherein the second sensing device includes at least one of a motion sensor, a distance detection sensor or an infrared detection sensor.

14. A wireless power reception device for a transportation apparatus, the wireless power reception device comprising:
a power reception unit configured to receive a wireless power signal;
a first communication unit configured to perform short-range wireless communication with a wireless power transmission device;
a second communication unit configured to perform in-vehicle communication; and
a first controller configured to determine a strength of required power based on status information received through the second communication unit,
wherein the status information includes:
boarding status information for identifying whether passengers of the transportation apparatus have exited; and
safety status information including distances between the passengers and the wireless power reception device,
wherein, upon determining that all the passengers have exited and been spaced apart from the wireless power reception device by a predetermined reference value or more while first power is received, a second power higher than the first power is requested from the wireless power transmission device through the first communication unit.

15. The wireless power reception device according to claim 14, wherein the boarding status information is generated based on at least one of:
pressure sensing information collected from pressure sensors mounted in seats provided in the transportation apparatus;

opening/closing sensing information of doors provided in the transportation apparatus; or image sensing information corresponding to images captured by a camera mounted in the transportation apparatus.

* * * * *